(12) United States Patent
Patel et al.

(10) Patent No.: US 8,316,319 B1
(45) Date of Patent: Nov. 20, 2012

(54) EFFICIENT SELECTION OF CHARACTERS AND COMMANDS BASED ON MOVEMENT-INPUTS AT A USER-INERFACE

(75) Inventors: Nirmal Patel, Mountain View, CA (US); Thad Eugene Starner, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/108,739

(22) Filed: May 16, 2011

(51) Int. Cl.
*G06F 3/048* (2006.01)
*G06F 3/00* (2006.01)
*G06F 5/00* (2006.01)

(52) U.S. Cl. .............................. 715/810; 710/38; 710/39
(58) Field of Classification Search .................... 710/38, 710/36; 715/810
See application file for complete search history.

(56) References Cited

U.S. PATENT DOCUMENTS

| | | | | |
|---|---|---|---|---|
| 5,574,482 | A * | 11/1996 | Niemeier | 345/173 |
| 5,759,044 | A * | 6/1998 | Redmond | 434/307 R |
| 6,034,653 | A * | 3/2000 | Robertson et al. | 345/8 |
| 6,091,546 | A * | 7/2000 | Spitzer | 359/618 |
| 6,452,544 | B1 * | 9/2002 | Hakala et al. | 342/357.31 |
| 7,057,607 | B2 | 6/2006 | Mayoraz et al. | |
| 7,486,302 | B2 * | 2/2009 | Shoemaker | 345/661 |
| 7,487,461 | B2 * | 2/2009 | Zhai et al. | 715/773 |
| 7,663,509 | B2 | 2/2010 | Shen | |
| 7,716,579 | B2 | 5/2010 | Gunn et al. | |
| 7,818,691 | B2 * | 10/2010 | Irvine | 715/856 |
| 7,821,503 | B2 | 10/2010 | Stephanick et al. | |
| 7,856,603 | B2 | 12/2010 | Molgaard | |
| 8,106,890 | B2 * | 1/2012 | Do et al. | 345/173 |
| 8,175,639 | B2 * | 5/2012 | Amirmokri | 455/556.1 |
| 8,199,126 | B1 * | 6/2012 | Taubman | 345/173 |
| 2006/0012884 | A1 * | 1/2006 | Snorteland et al. | 359/630 |
| 2006/0055669 | A1 * | 3/2006 | Das | 345/156 |

(Continued)

FOREIGN PATENT DOCUMENTS

WO WO2007/124614 11/2007

OTHER PUBLICATIONS

Kristensson, Design and Evaluation of a Shorthand Aided Soft Keyboard, Aug. 28, 2002. pp. 1-107.*

(Continued)

*Primary Examiner* — William Bashore
*Assistant Examiner* — Ece Hur
(74) *Attorney, Agent, or Firm* — McDonnell Boehnen Hulbert & Berghoff LLP

(57) ABSTRACT

An example method involves: providing a user-interface having a plurality of input regions, where one of the input regions is a home region, where each of the input regions is associated with a primary character from a set of primary characters, and where at least one of the input regions is associated with a subset of secondary characters from a set of secondary characters; receiving data indicating an input-movement from the home region to a second input region from the plurality of input regions that is associated with a subset of secondary characters; receiving data indicating an input-movement from the second input region to the home region; selecting, in response to the input-movement from the second input region to the home region, a character from the subset of secondary characters associated with the second input region; and causing the selected character to be displayed on a graphical display.

16 Claims, 19 Drawing Sheets

U.S. PATENT DOCUMENTS

| | | | |
|---|---|---|---|
| 2006/0119582 A1* | 6/2006 | Ng et al. .................... | 345/168 |
| 2006/0242607 A1 | 10/2006 | Hudson | |
| 2008/0158145 A1* | 7/2008 | Westerman ................ | 345/156 |
| 2008/0169998 A1* | 7/2008 | Jacobsen et al. ............ | 345/8 |
| 2009/0282370 A1 | 11/2009 | Rainwater et al. | |
| 2009/0288889 A1 | 11/2009 | Carlvik et al. | |
| 2010/0073329 A1 | 3/2010 | Raman et al. | |
| 2010/0085316 A1* | 4/2010 | Kim .......................... | 345/173 |
| 2010/0100849 A1 | 4/2010 | Fram | |
| 2010/0127994 A1* | 5/2010 | Aono et al. ................ | 345/173 |
| 2010/0149073 A1 | 6/2010 | Chaum et al. | |
| 2010/0164893 A1* | 7/2010 | Shin et al. ................. | 345/173 |
| 2010/0214234 A1* | 8/2010 | Singhal ..................... | 345/173 |
| 2010/0231521 A1* | 9/2010 | Nishimura ................. | 345/169 |
| 2010/0231534 A1* | 9/2010 | Chaudhri et al. ........... | 345/173 |
| 2010/0231537 A1* | 9/2010 | Pisula et al. ................ | 345/173 |
| 2010/0245276 A1 | 9/2010 | Sim | |
| 2010/0289761 A1* | 11/2010 | Kajiyama .................. | 345/173 |
| 2010/0315369 A1* | 12/2010 | Tokkonen .................. | 345/173 |
| 2010/0333011 A1* | 12/2010 | Kornev et al. ............. | 715/773 |
| 2011/0010622 A1 | 1/2011 | Fong | |
| 2011/0163989 A1* | 7/2011 | Singhal ..................... | 345/173 |
| 2011/0248991 A1* | 10/2011 | Park et al. .................. | 345/419 |
| 2012/0017147 A1* | 1/2012 | Mark ......................... | 715/702 |
| 2012/0019662 A1* | 1/2012 | Maltz ........................ | 348/158 |
| 2012/0166993 A1* | 6/2012 | Anderson et al. .......... | 715/771 |

OTHER PUBLICATIONS

Mertens, "Design Pattern Trabing: Touchscreen-based input Technique", 2010. pp. 267-272.*

Ken Perlin, Quickwriting: Continuous Stylus-based Text Entry. 1998 ACM, pp. 215, 216.*

Kristensson, Design and Evaluation of a Shorthand Aided Soft Keyboard, 2002.*

MacKenzie et al. Text Entry for Mobile Computing: Models and Methods, Theory and Practice. Human-Computer Interaction, 2002, vol. 17, pp. 147-198. Retrieved from the Internet: <URL: http://citeseerx.ist.psu.edu/viewdoc/download?doi=10.1.1.71.9151&rep=rep1&type=pdf> [Retrieved on: Mar. 31, 2011].

MacRumors. Apple Investigating Multi-Touch Display for Magic Mouse, Haptic Feedback for Virtual Keyboards? MacRumors.com, LLC, pp. 1-5, 2011 <URL: http://www.macrumors.com/2011/01/20/apple-investigating-multi-touch-display-for-magic-mouse-haptic-feedback-for-virtual-keyboards/> [Retrieved on: May 16, 2011].

New York University mrl, Quickwriting, NYU Media Research Lab, pp. 1-3, Retrieved from the Internet: <URL: http://mrl.nyu.edu/projects/quikwriting/> [Retrieved on: May 16, 2011].

Perlin, Ken. Quikwriting: Continuous Stylus-based Text Entry. Retrieved from the Internet: <URL: http://mrl.nyu.edu/perlin/doc/quikwriting/quikwriting.pdf> [Retrieved on: May 16, 2011].

8pen. Reinventing the keyboard for touch-enabled devices. 2011 <URL: http://www.the8pen.com/> [Retrieved on: May 16, 2011].

* cited by examiner

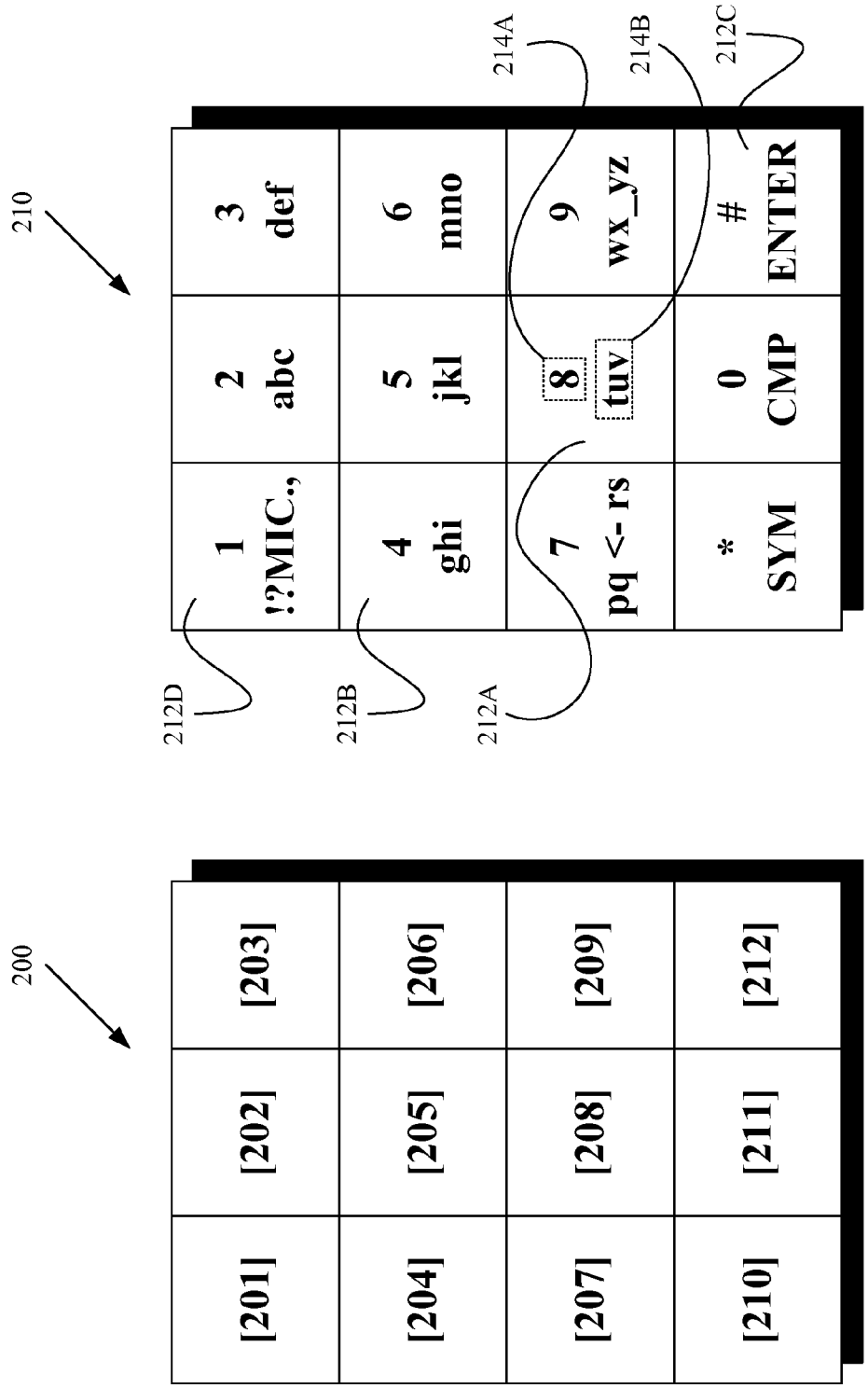

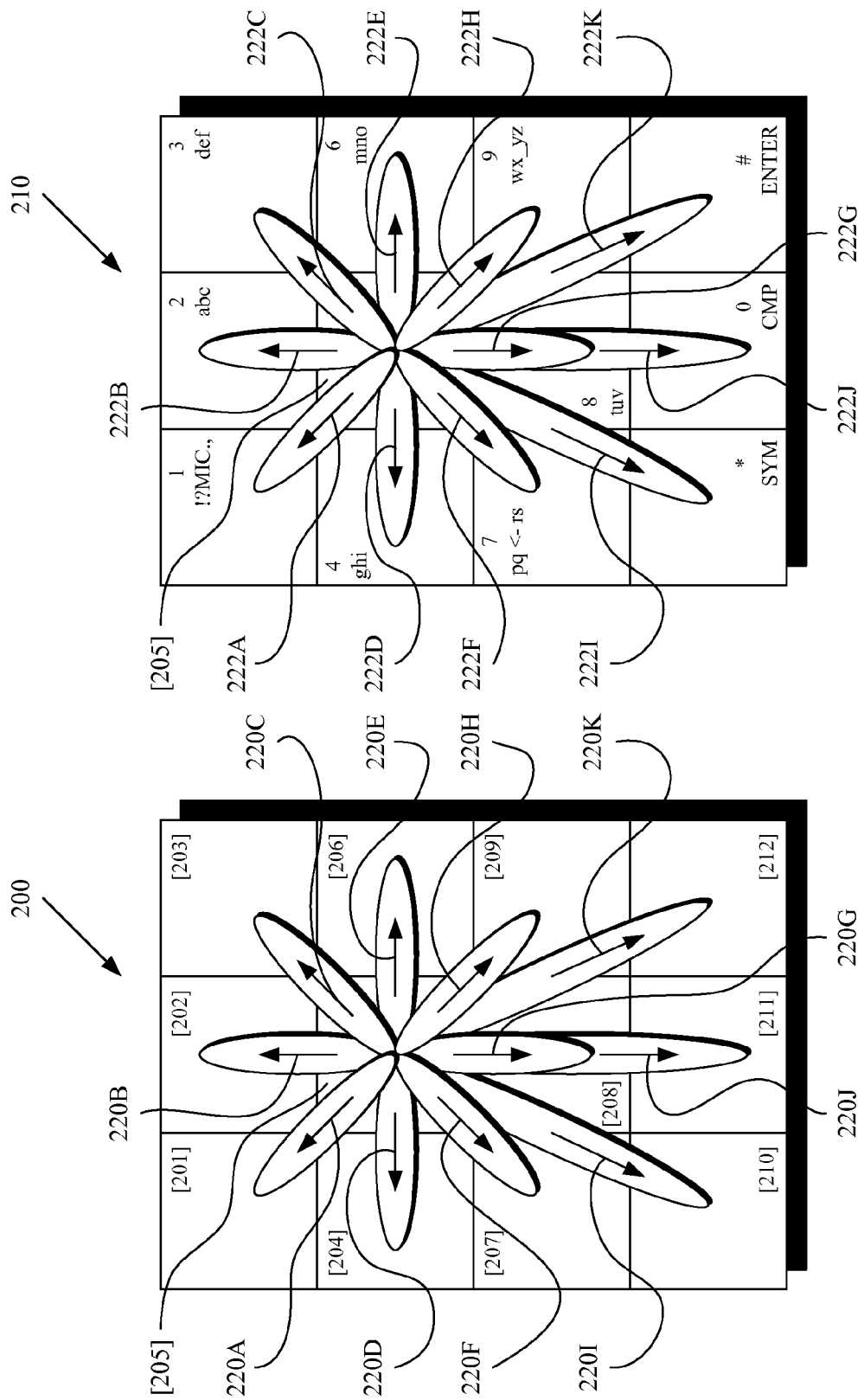

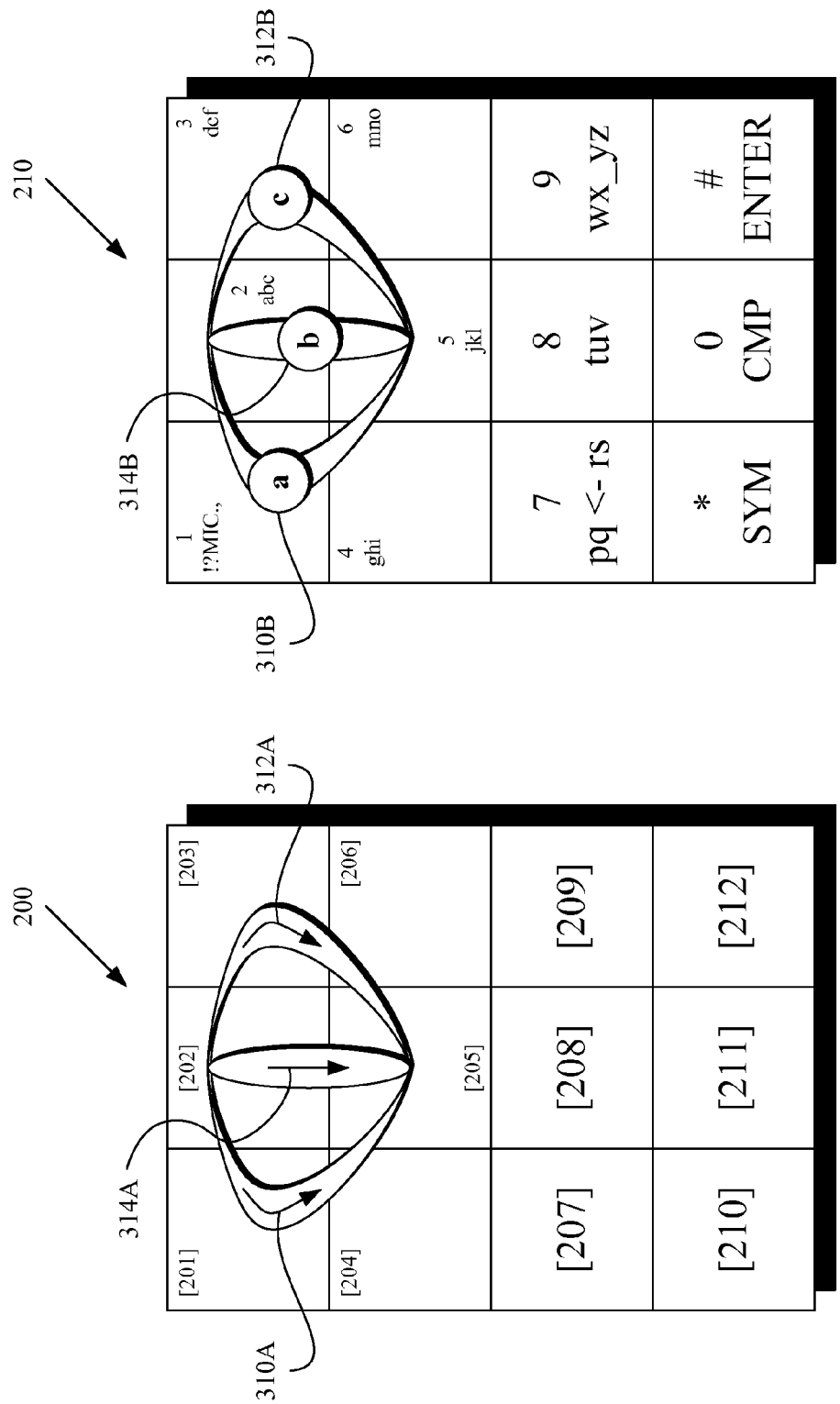

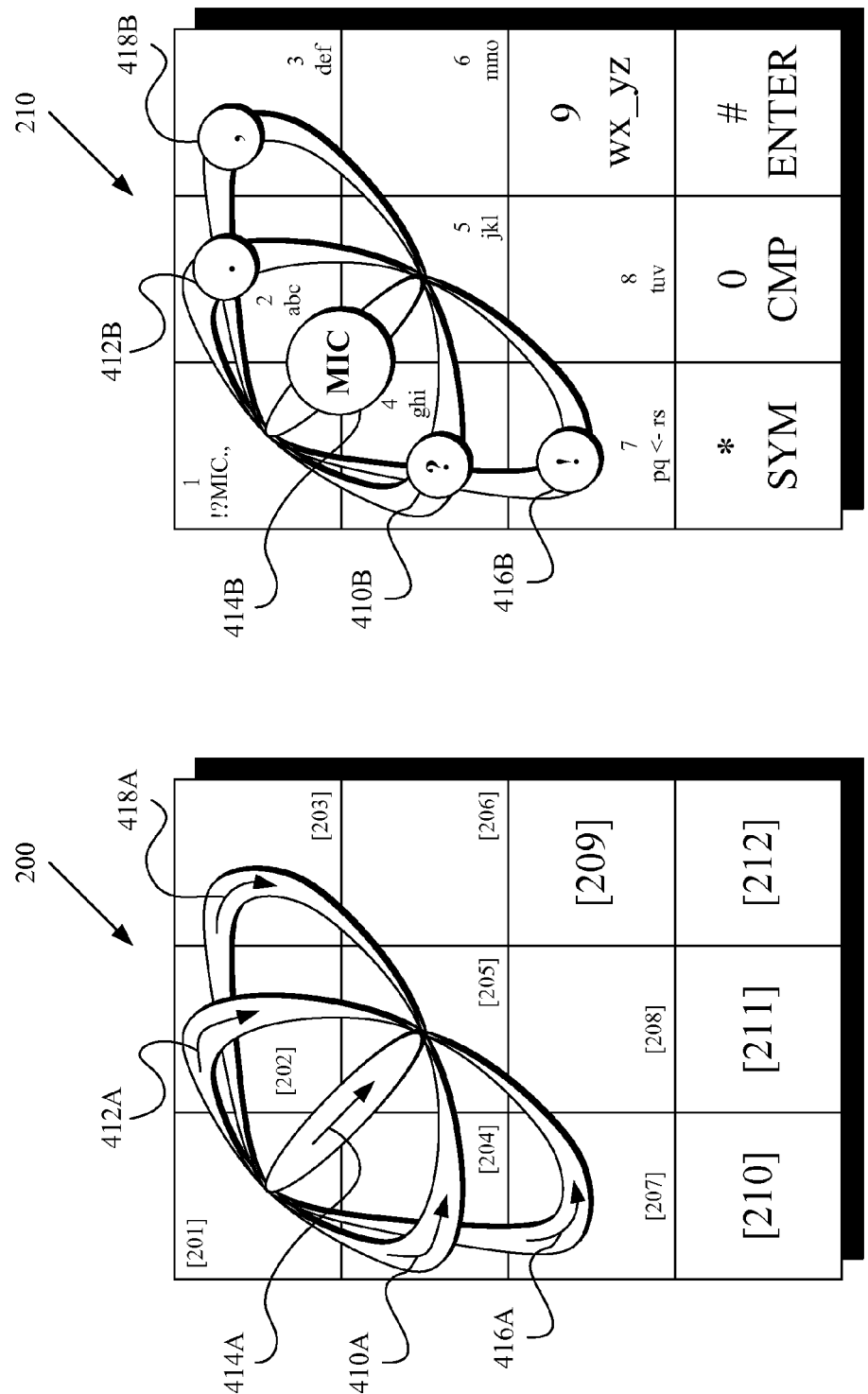

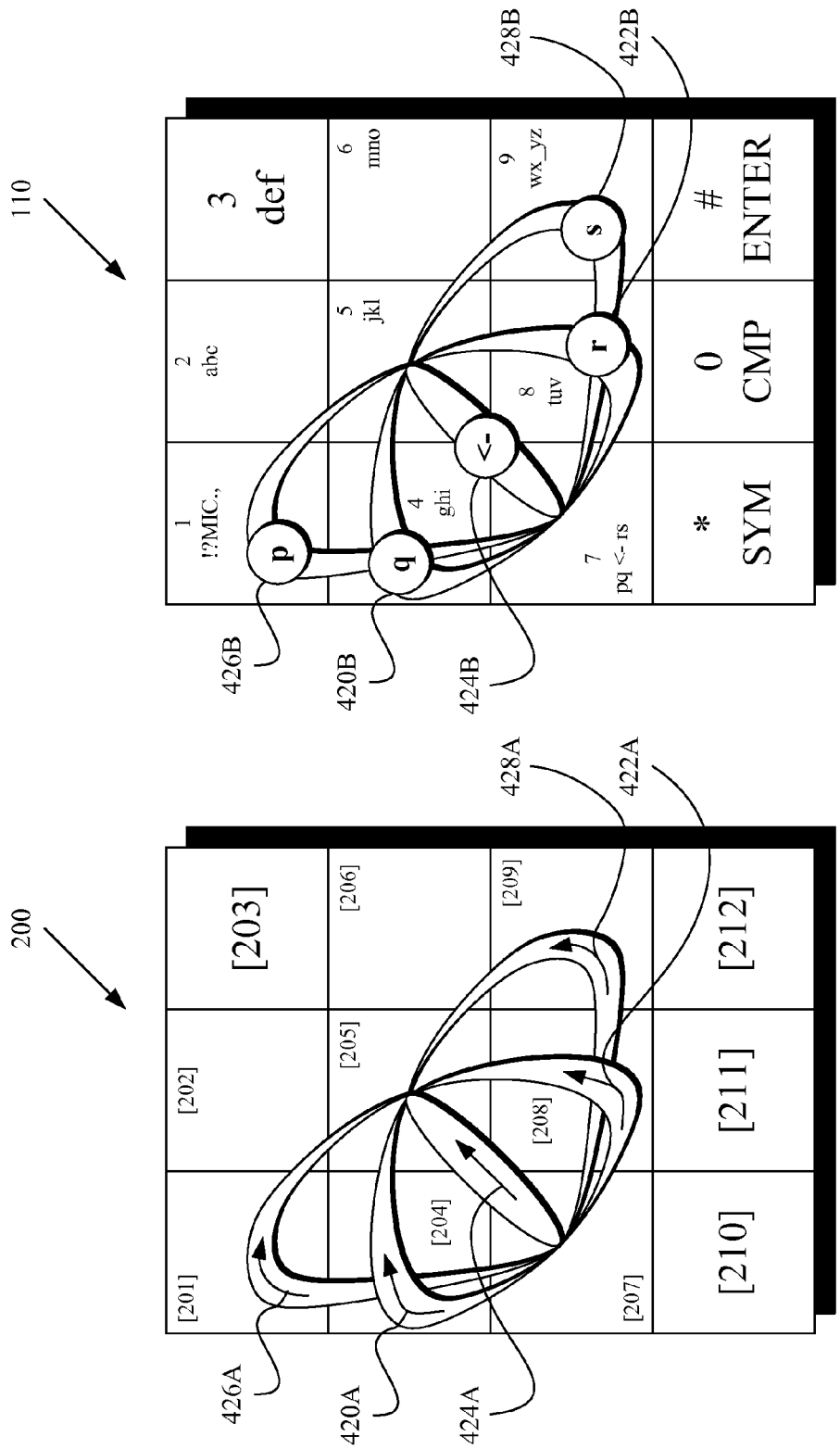

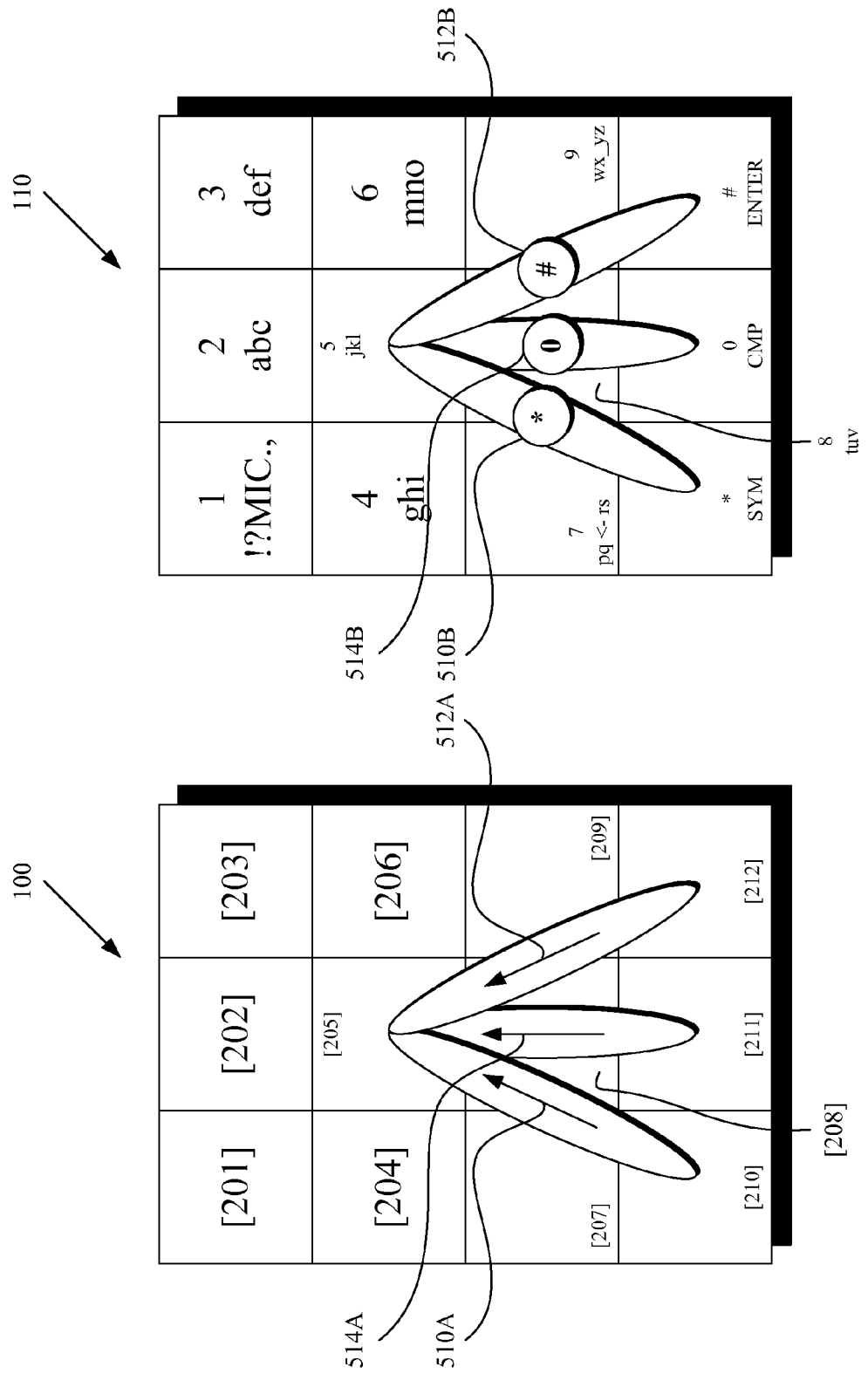

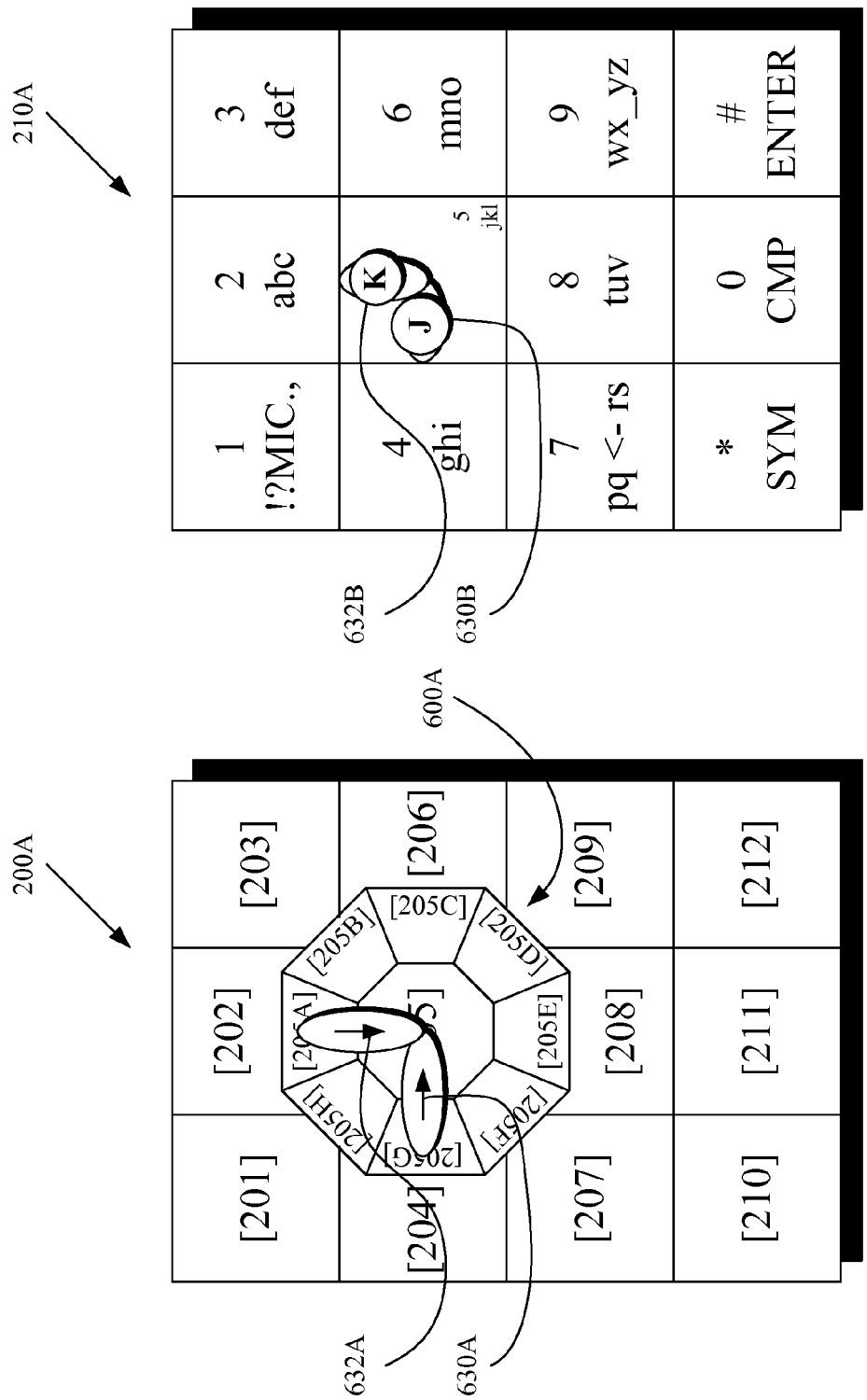

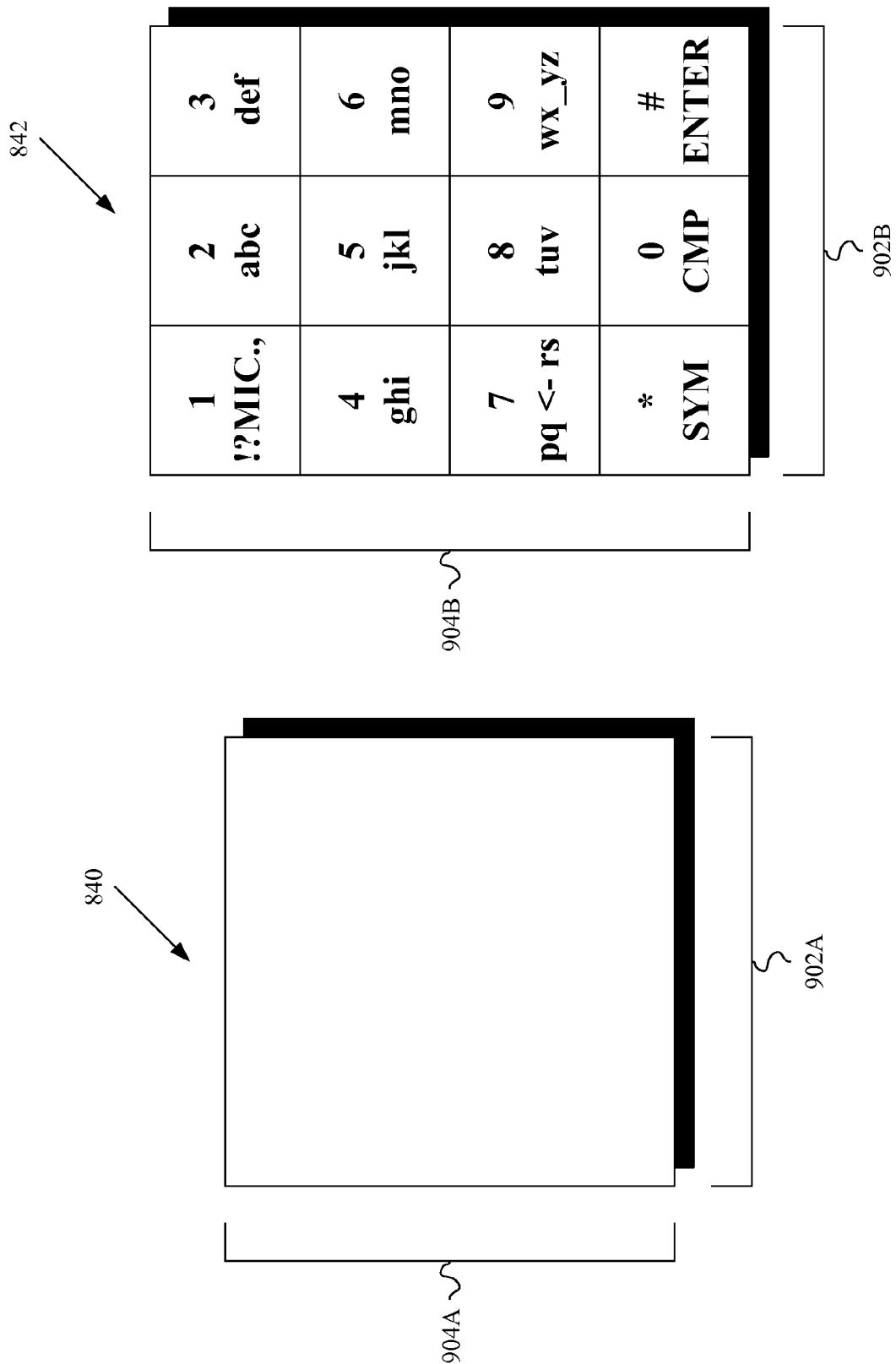

EFFICIENT SELECTION OF CHARACTERS AND COMMANDS BASED ON MOVEMENT-INPUTS AT A USER-INERFACE

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, among many other types of computing systems, are increasingly prevalent in numerous aspects of modern life. As computers become progressively more integrated witCh users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is a "pointing device" that may allow a user to input spatial data into a computing system. The spatial data may be received and processed by the computing system, and may ultimately be used by the computing system as a basis for executing certain computing functions.

One type of pointing device may, generally, be based on a user moving an object. Examples of common such pointing devices include a computer mouse, a trackball, a joystick, a pointing stick, and a roller mouse. Other examples of pointing devices based on a user moving an object may exist as well. In typical arrangements, the object includes sensors that are arranged to transmit, to the computing system, data that indicates the distance and direction of movement of the object. The computing system may be equipped with a graphical display that may, for example, provide a visual depiction of a graphical pointer that moves in accordance with the movement of the object. The graphical display may also provide a visual depiction of other objects that the user may manipulate, including, for example, a visual depiction of a graphical user-interface. The user may refer to such a graphical user-interface when inputting data.

Another type of pointing device may, generally, be based on a user touching a surface. Examples of common such pointing devices include a touchpad and a touch screen. Other examples of pointing devices based on a user touching a surface may exist as well. In typical arrangements, the surface is a flat surface that can detect contact with the user's finger (and/or another pointing tool such as a stylus). For example, the surface may include electrode-sensors that are arranged to transmit, to the computing system, data that indicates the distance and direction of movement of the finger on the surface. The computing system may be equipped with a graphical display similar to the graphical display described above. Implementations of a touchpad typically involve a graphical display that is physically remote from the touchpad. However, a touchscreen is typically characterized by a touchpad embedded into a graphical display such that users may interact directly with a visual depiction of the graphical user-interface, and/or other elements displayed on the graphical display, by touching the graphical display itself.

User-interfaces may be arranged to provide various combinations of keys, buttons, and/or, more generally, input regions. Often, user-interfaces will include input regions that are associated with multiple characters and/or computing commands. Typically, users may select various characters and/or various computing commands, by performing various input actions on the user-interface.

However, difficulties can arise when user-interfaces include input regions that are associated with multiple characters and/or computing commands. More particularly, in such situations, users typically must carry out complex and burdensome input procedures to disambiguate between the multiple characters and/or computing commands that may be associated with a given input region. As a result, known methods for selecting characters and/or computing commands using such user-interfaces are often considered inconvenient, inefficient, and/or non-intuitive.

SUMMARY

The systems and methods described herein may help to provide for more convenient, efficient, and/or intuitive selection of characters and/or computing commands via a user-interface that includes a plurality of input regions, with each input region being associated with various characters and/or computing commands. In an example embodiment, the user may carry out various input-movements via the user-interface to, for example, (i) indicate, via a first input-movement, which input region an associated character and/or computing command should be selected from and to then (ii) disambiguate between the characters and/or computing commands associated with the input region by indicating, via a second input-movement, which particular character and/or computing command associated with the input region should be selected.

An example embodiment may involve a standard 3×4 keypad such as that which is typically provided on a telephone for entering phone numbers to be dialed. In such an example embodiment, each input region in the plurality of input regions may correspond to a button of the standard 3×4 keypad. Accordingly, as is typical of standard 3×4 keypads, certain input regions may be associated with a primary character. Such primary characters may include, for example, a number such as any of "0", "1", "2", . . . "9", and/or may include a symbol such as "*" or "#". As is also typical of standard 3×4 keypads, certain input regions may be associated with a secondary character. Such secondary characters may include, for example, a letter such as any of "a", "b", "c", . . . "z".

In one aspect, an example method involves: (a) providing a user-interface having a plurality of input regions, where one of the input regions is a home region, where each of the input regions is associated with a primary character from a set of primary characters, and where at least one of the input regions is associated with a subset of secondary characters from a set of secondary characters, (b) receiving data indicating an input-movement from the home region to a second input region from the plurality of input regions that is associated with a subset of secondary characters, (c) receiving data indicating an input-movement from the second input region to the home region, (d) selecting, in response to the input-movement from the second input region to the home region, a character from the subset of secondary characters associated with the second input region, and (d) causing the selected character to be displayed on a graphical display. Such an example method may be carried out by a computing system that includes a non-transitory computer readable medium and program instructions that are stored on the non-transitory computer readable medium and that are executable by at least one processor.

The data indicating an input-movement from the second input region to the home region may further indicate that the input-movement from the second region to the home region was from the second region, through one or more input regions from the plurality of input regions, to the home region. Thus, generally, the computing system may select different characters based on the particular input regions involved in the input-movement from the second input region to the home region.

In another aspect, a non-transitory computer readable medium having instructions stored thereon is disclosed. According to an example embodiment, the instructions include: (a) instructions for providing a user-interface having a plurality of input regions, where one of the input regions is a home region, where each of the input regions is associated with a primary character from a set of primary characters, and where at least one of the input regions is associated with a subset of secondary characters from a set of secondary characters, (b) instructions for receiving data indicating an input-movement from the home region to a second input region from the plurality of input regions that is associated with a subset of secondary characters, (c) instructions for receiving data indicating an input-movement from the second input region to the home region, (d) instructions for selecting, in response to the input-movement from the second input region to the home region, a character from the subset of secondary characters associated with the second input region, and (e) instructions for causing the selected character to be displayed on a graphical display.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 2A shows aspects of an example user-interface in accordance with an example method for receiving user-inputs.

FIG. 2B shows aspects of an example user-interface graphical display in accordance with the user-interface shown in FIG. 2A.

FIG. 2D shows example first input-movements in accordance with an example method for receiving user-inputs.

FIG. 2E shows aspects of an example user-interface graphical display in accordance with the first input-movements shown in FIG. 2D.

FIG. 3A shows example second input-movements in accordance with an example method for receiving user-inputs.

FIG. 3B shows aspects of an example user-interface graphical display in accordance with the second input-movements shown in FIG. 3A.

FIG. 4A shows additional example second input-movements in accordance with an example method for receiving user-inputs.

FIG. 4B shows aspects of an example user-interface graphical display in accordance with the second input-movements shown in FIG. 4A.

FIG. 4C shows additional example second input-movements in accordance with an example method for receiving user-inputs.

FIG. 4D shows aspects of an example user-interface graphical display in accordance with the second input-movements shown in FIG. 4C.

FIG. 5A shows additional example second input-movements in accordance with an example method for receiving user-inputs.

FIG. 5B shows aspects of an example user-interface graphical display in accordance with the second input-movements shown in FIG. 5A.

FIG. 6E shows additional example second input-movements in accordance with an example method for receiving user-inputs.

FIG. 6F shows aspects of an example user-interface graphical display in accordance with the second input-movements shown in FIG. 6E.

FIG. 9 shows aspects of an example user-interface and an example user-interface graphical display having non-uniform dimensions in accordance with an example embodiment.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. User-Inputs

The disclosure herein generally relates to methods involving a computing system receiving user-inputs from a user-interface and executing certain computing functions based on the received user-inputs. The user inputs may be carried out by a user via a user-interface, and the user inputs may be received as data transmitted to the computing system by the user-interface. In an embodiment, the user-interface may be any suitable pointing device, such as any of the pointing devices described above. Other examples of user-interfaces exist as well.

Figure 1A:
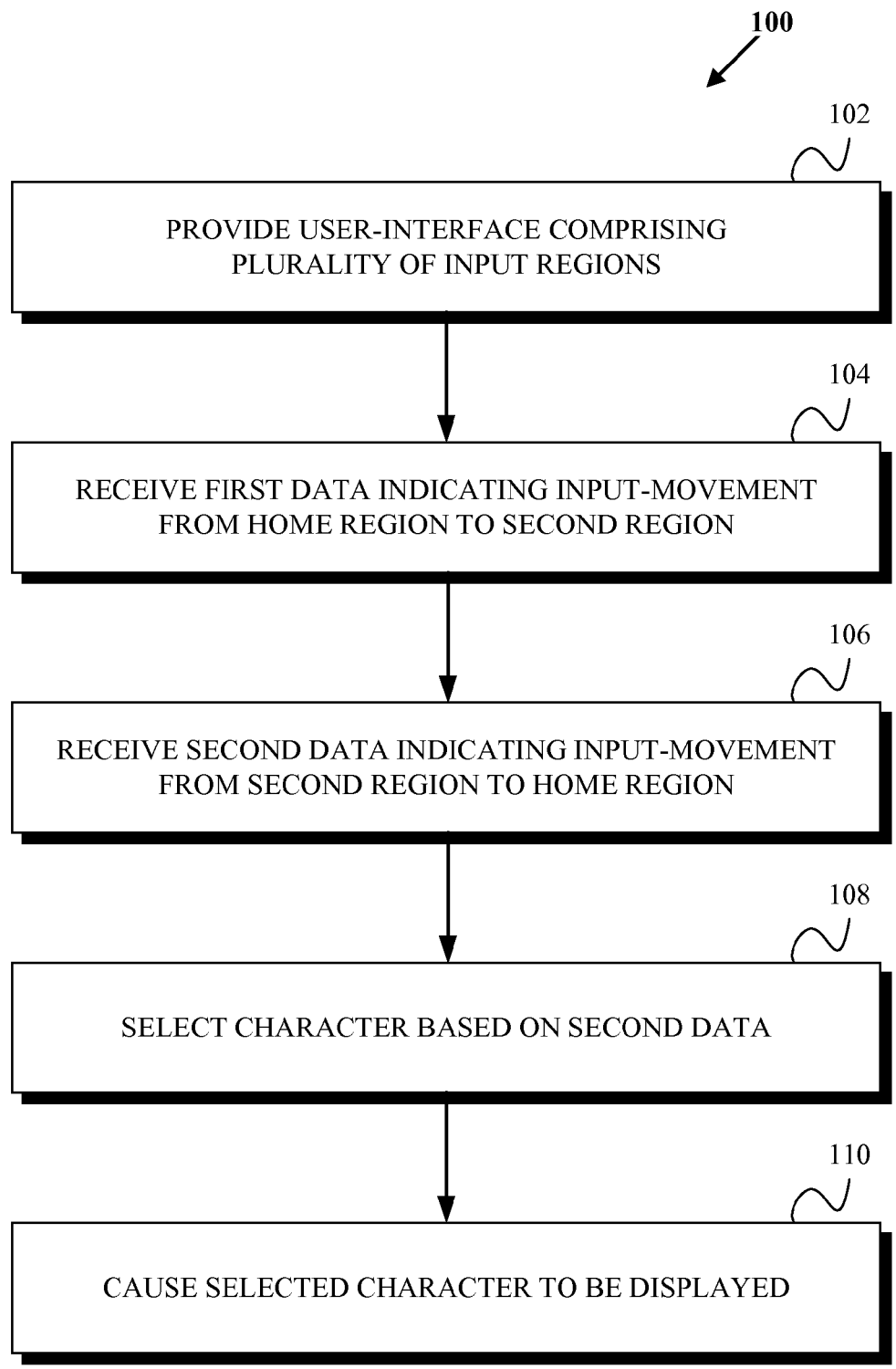
FIG. 1A shows a flowchart depicting a first example method for receiving user-inputs via a user-interface.

FIG. 1A shows a flowchart depicting a first example method 100 for receiving user-inputs via a user-interface. As discussed further below, aspects of example method 100 may be carried out by any suitable computing system, or any suitable components thereof. Example method 100 begins at block 102 with providing a user-interface comprising a plurality of input regions. At block 104, the computing system receives first data indicating input-movement from a home region of the user-interface to a second region of the user-interface. At block 106, the computing system, after receiving the first data, receives second data indicating input-movement from the second region to the home region. At block 108, the computing system selects a character based on the received second data. Then, at block 110, the computing system causes the selected character to be displayed on a graphical display.

Figure 1B:
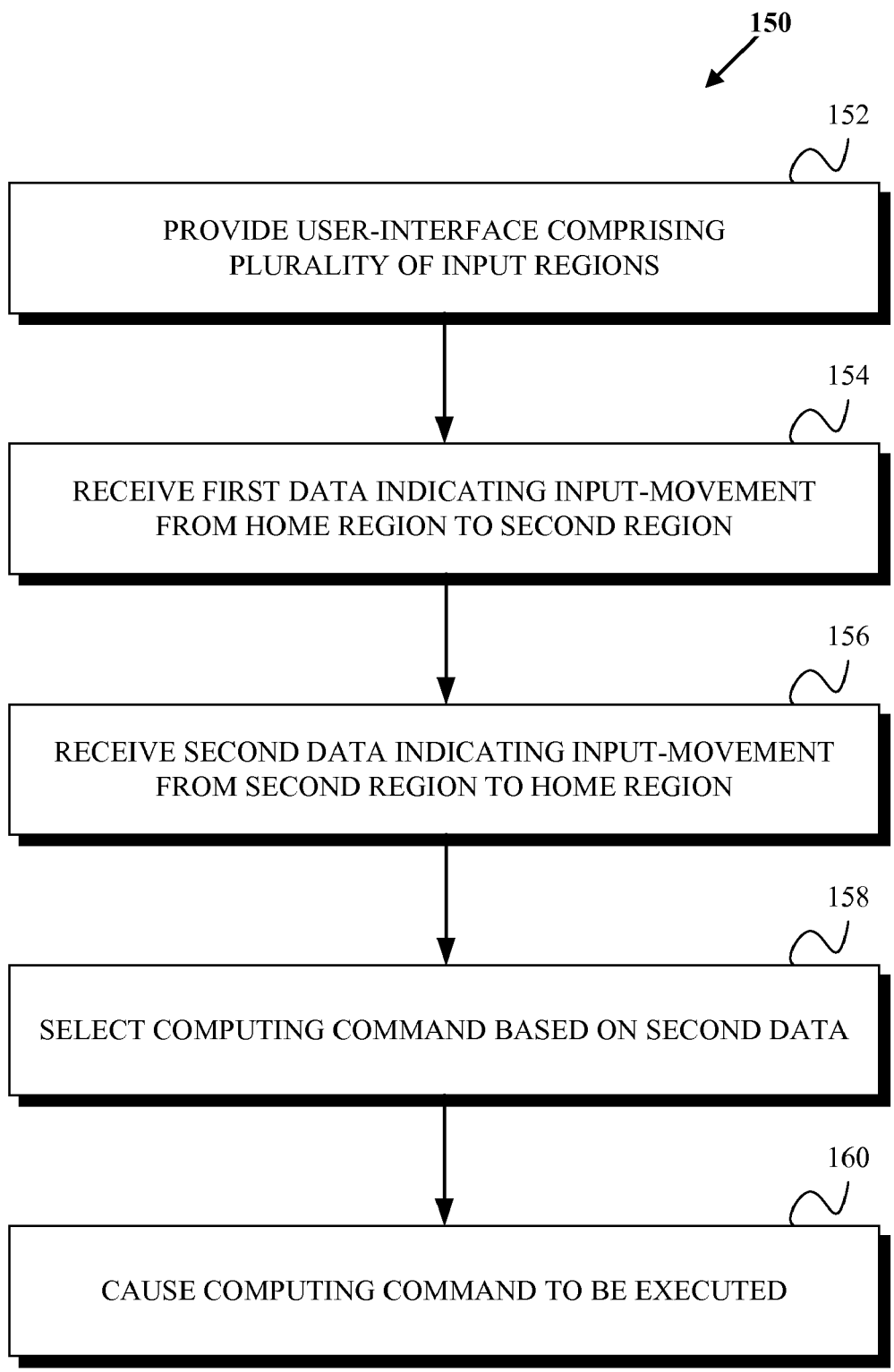
FIG. 1B shows a flowchart depicting a second example method for receiving user-inputs via a user-interface.

FIG. 1B shows a flowchart depicting a second example method 150 for receiving user-inputs via a user-interface. Blocks 152, 154, and 156 generally correspond, respectively, to blocks 102, 104, and 106 of example method 100 and involve, respectively, providing a user-interface comprising a plurality of input regions, receiving first data indicating input-movement from a home region of the user-interface to a second region of the user-interface, and receiving second data indicating input-movement from the second region to the home region. At block 158, the computing system selects a computing command based on the received second data. Then, at block 160, the computing system causes the computing command to be executed. The methods depicted in FIGS. 1A and 1B, are discussed further below.

a. User-Interface

At block 102 and at block 152, respectively, example method 100 and example method 150 involve providing a user-interface comprising a plurality of input regions. Generally, the user-interface may be any user-interface that provides a plurality of input regions, regardless of, for example, shape, size, number, or arrangement of the input regions. The user-interface may be communicatively coupled to a graphical display that may provide a visual depiction of the input regions of the user-interface along with a visual depiction of the position of a pointer relative to the input regions.

With reference to FIG. 2A, example user-interface 200 is shown. It should be understood, however, that example user-interface 200 is shown for purposes of example and explanation only, and should not be taken to be limiting.

Example user-interface 200 is arranged to provide plurality of input regions 201-212. For example, area 201 may be a first input region, area 205 may be a second input region, area 212 may be a third input region, and so on. As noted above, in an example embodiment, user-interface 200 may be a touchscreen, having a touchpad embedded into a graphical display, and may be arranged to depict plurality of input regions 201-212. In another embodiment, user-interface 200 may be a touchpad. In an embodiment where user-interface 200 is a touchpad, a visual depiction of the user-interface may be provided on a graphical display that is physically remote from the movable object or touchpad. Other embodiments of user-interface 200 are certainly possible as well, including, but not limited to, any of the user-interfaces discussed above.

Further, the methods described herein may be applied to a movable pointing device that is communicatively coupled to a graphical display. In such an example arrangement, the input regions may exist entirely virtually (as depicted by a graphical display) and a user may carry out input movements between such input regions by moving a virtual pointer between the input regions using the movable pointing device.

In an example arrangement, input regions 201-212 may be associated with one or more characters. For example, an input region may be associated with a primary character from a set of primary characters. As another example, an input region may also, or alternatively, be associated with a subset of secondary characters from a set of secondary characters. Input regions may also be associated with one or more computing commands.

With reference to the example embodiment shown in FIG. 2B, user-interface graphical display 210 depicts a plurality of input regions, which generally correspond to the input regions of user-interface 200. User-interface graphical display 210 is, in appearance, an arrangement that users may be familiar with by way of their use of, for example, phones and/or computer keyboards. More specifically, user-interface graphical display 210 provides input regions arranged in a 3×4 grid, with an input region associated with each of the numbers "0" through "9", and input regions associated with the "*" and "#" characters. This arrangement is common on many phones, computer keyboards, and other devices. It should be understood, however, that example embodiments are in no way limited to such devices, and may be implemented with or carried out by many other types of computing devices having touchpad and/or touchscreen interfaces.

Various input regions of user-interface 200, as depicted by user-interface graphical display 210, may be associated with a primary character from a set of primary characters and a subset of secondary characters from a set of secondary characters. For example, as depicted by user-interface graphical display 210, input region 212A, which corresponds to input region 208 of user-interface 200, is associated with primary character 214A ("8"), and is also associated with subset of secondary characters 214B ("t", "u", and "v"). As another example, input region 212B, which corresponds to input region 204 of user-interface 200, is associated with primary character "4", and is also associated with secondary characters "g", "h", and "i".

Thus, the particular embodiment shown by FIGS. 2A and 2B is implemented using input regions arranged in a familiar 3×4 grid. Accordingly, such an embodiment may be implemented so as to be compatible with familiar input methods that are traditionally associated with a 3×4 grid of input regions. As one particular example, a user may be capable of selecting a primary character, such as "8", by tapping the input region associated with primary character "8" (input region 208), in accordance with familiar input techniques. At the same time, the user may be capable of selecting primary character "8" in accordance with the methods for selecting such primary characters described herein, and discussed further below. As another particular example, a user may be capable of selecting a secondary character, such as "u", by tapping the input region associated with secondary character "u" (input region 208) two times, in accordance with familiar input techniques. At the same time, the user may be capable of selecting secondary character "u" in accordance with the methods for selecting such secondary characters described herein, and discussed further below.

Thus, among the benefits of the methods disclosed herein is the ability of such methods to be implemented using familiar arrangements of input regions, and therefore, more generally, the ability of such methods to be implemented using familiar input devices. The methods disclosed herein allow for the preservation, and implementation, of familiar arrangements of input regions on user-input devices. Accordingly, user-interfaces implemented in accordance with the presently disclosed methods may enable users to use alternative (including familiar) input techniques, without knowledge of (or instead of) the methods disclosed herein. Alternatively, users may use such alternative input techniques in addition to the methods disclosed herein.

Herein, for purposes of explanation, the input regions shown in user-interface 200 may be referred to by reference to the primary character with which they are associated. Thus, input region 212A, as depicted by user-interface graphical display 210 and corresponding to input region 208 of user-interface 200, may be referred to as the "8 region," input region 212B, as depicted by user-interface graphical display 210 and corresponding to input region 204 of user-interface 200, may be referred to as the "4 region," and so on.

In an example arrangement, input regions in the plurality of input regions 201-212 may also, or alternatively, be associated with one or more computing commands. For example, as depicted by user-interface graphical display 210, input region 212C, which corresponds to input region 212 of user-interface 200, is associated with a computing command indicated by the phrase "ENTER". The computing command indicated by the phrase "ENTER" may be a computing command that causes a computing system to, for example, enter a "hard return" in a text-entry context, or submit data in another context. As another example, the input region 212D, as depicted by user-interface graphical display 210 and corresponding to input region 201 of user-interface 200, is associated with a computing command indicated by the phrase "MIC". The computing command indicated by the phrase "MIC" may be, for example, a command to execute a sound-recording application that may be used for purposes of speech recognition.

As shown in FIG. 2B, the primary character that a given input region may be associated with may include one of the integers 0-9 and/or may include one of various symbol characters including, but not limited to, "*", "a", "@", "$", "%", "A", "&", "+", and "=". The secondary characters that a given input region may be associated with may include any letter from an alphabet (for example, any set of symbols that represents a language) and/or may include any punctuation mark (for example, any symbol that indicates the structure of a language). Other examples of primary characters and/or secondary characters are certainly possible as well and the examples discussed herein should not be taken to be limiting.

The computing commands that a given input region may be associated with may include computing commands that are generally used for entering, modifying, or otherwise editing strings of characters. For example, the computing command associated with the symbol "←" may be a command to delete a character, the computing command associated with the symbol "_" may be a command to enter a space, the computing command associated with the phrase "CMP" may be a command to enter a suggested string of characters, the computing command associated with the phrase "SYM" may be associated with a computing command to display additional symbols that various input regions may be associated with, and, as discussed above, the computing command associated with the phrase "ENTER" may be a command to enter a "hard return."

Alternatively, the computing commands that a given input region may be associated with may include computing commands that are generally associated with executing a particular application on a computing system. As one example, as discussed above, the computing command associated with the phrase "MIC" may be a command to execute a sound-recording application which may be used for purposes of speech recognition. Those of skill in the art will appreciate that other examples of computing commands are certainly possible as well. Generally, the computing commands referred to herein may be any computing function that may be executed by a computing system.

Although above various characters and/or computing commands are described as being associated with various input regions, input regions may be associated with other characters, computing commands, or other computing functions. Further, user-interface 200 may be capable of being dynamically arranged in a customized manner so that the input regions of the user-interface are associated with characters and/or computing commands that are most useful to the user. As one example, if a user regularly uses a particular computing application, a user may assign to a particular input region a command to execute the particular computing application. As another example, a user may assign to a particular input region a computing command to execute a particular macro routine so that the particular macro routine may be conveniently executed while using, for instance, a computing application that the user regularly runs.

Figure 2C:
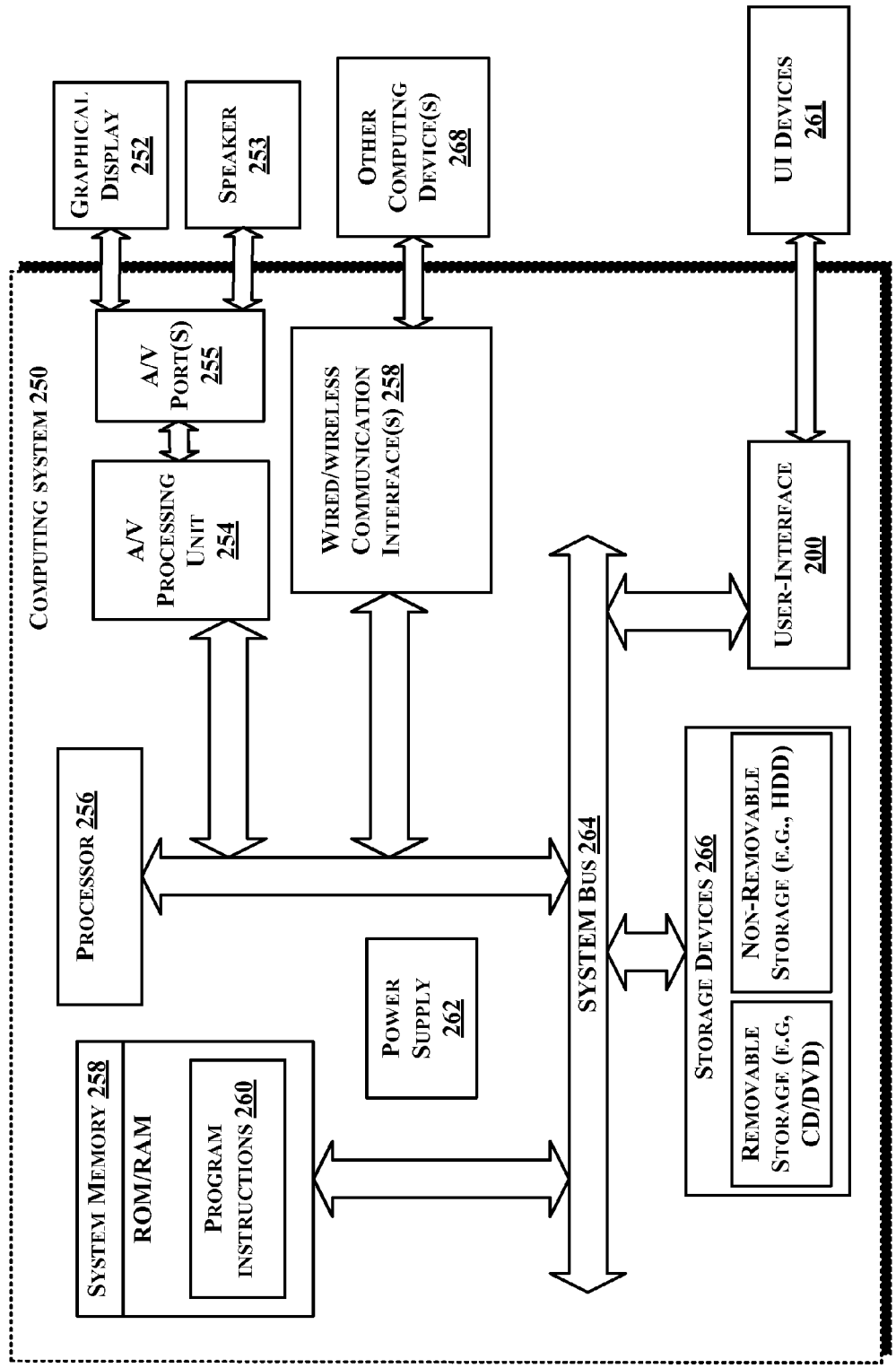
FIG. 2C shows a simplified block diagram depicting components of an example computing system in accordance with an example method for receiving user-inputs.

As described above, user-interface 200 may be part of, or otherwise communicatively coupled to, a computing system such as computing system 250 as shown in FIG. 2C. Computing system 250 may also include at least one processor 256 and system memory 258. In an example embodiment, computing system 250 may include a system bus 264 that communicatively connects processor 256 and system memory 258, as well as other components of computing system 250. Depending on the desired configuration, processor 256 can be any type of processor including, but not limited to, a microprocessor (µP), a microcontroller (µC), a digital signal processor (DSP), or any combination thereof. Furthermore, system memory 258 can be of any type of memory now known or later developed including but not limited to volatile memory (such as RAM), non-volatile memory (such as ROM, flash memory, etc.) or any combination thereof.

An example computing system 250 may include various other components as well. For example, computing system 250 includes an A/V processing unit 254 for controlling graphical display 252 and speaker 253 (via A/V port 255), one or more communication interfaces 258 for connecting to other computing devices 268, and a power supply 262. Graphical display 252 may be arranged to provide a visual depiction of various input regions provided by user-interface 200, such as the depiction provided by user-interface graphical display 210. Note, also, that user-interface 200 may be compatible with one or more additional user-interface devices 261 as well.

Furthermore, computing system 250 may also include one or more data storage devices 266, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 250.

According to an example embodiment, computing system 250 may include program instructions that are stored in system memory 258 (and/or possibly in another data-storage medium) and executable by processor 256 to facilitate the various functions described herein including, but not limited to, those functions described with respect to FIGS. 1A and 1B. Although various components of computing system 250 are shown as distributed components, it should be understood that any of such components may be physically integrated and/or distributed according to the desired configuration of the computing system.

Generally, user-interface 200 may be arranged to transmit data that indicates certain user inputs to other components of the computing system. For example, user-interface 200 may be arranged to transmit data indicating input-movements between input regions to one of storage devices 266, system memory 258, and/or processor 256. Processor 256 may then use such data, in accordance with program instructions stored in system memory 258, as a basis to execute various functions. In accordance with aspects of the example methods disclosed herein, such computing functions may include selecting and displaying various characters and/or selecting and executing various computing commands.

Described below are examples of user-inputs that may be carried out by a user in accordance with the example methods described herein. For purposes of explanation various input-movements are referred to "first input-movements" and various input-movements are referred to as "second input-movements." Such descriptive terms are used for purposes of explaining particular examples of user-inputs that may be carried out in accordance with the example methods described herein. However, it should be understood that other types, examples, and combinations of input-movements may be possible as well and that, therefore, the particular types, examples, and combinations of input-movements described herein should not be taken to be limiting.

b. First Input-Movement

As discussed above, example user-interface 200 may be generally configured to detect, recognize, track, or otherwise sense movement of an input pointer to, from, and/or between input regions. For example, in an example embodiment where user-interface 200 is a touchscreen or touchpad, user-interface 200 may be configured to detect the movement of a user's finger, a stylus, or other input pointer, across the surface of the touchscreen or touchpad to, from, and/or between input regions. Upon detecting such movement, user-interface 200 may be configured to generate data indicating the movement, which user-interface 200 may generally make available for use by other components of computing system 250, perhaps by way of system bus 264. For example, as generally discussed above, user-interface may transmit data indicating movement to processor 256 for purposes of executing any of the functions described herein, including, but not limited to, those functions described with respect to FIGS. 1A and 1B.

At block 104 and at block 154, respectively, example method 100 and example method 150 continue with the computing system receiving first data indicating first input-movement from a home region to a second region. The home region and the second region may be, for example, any input region in the plurality of input regions 201-212 of user-interface 200. As shown in FIG. 2D, for example, input region 205 may be the home region. According to such an example, any of other input regions 201-204, and 206-212 may be the second region.

Accordingly, therefore, any one of a number of possible input movements may be considered, when detected, to be a first input movement. For example, such a first input movement may be any one of first input movements 220A-220K, as shown in FIG. 2D.

As shown by first input-movement 220D, the second region may be input region 204 and the first input-movement may therefore be from input region 205 (the home region) to input region 204 (the second region). As shown by first input-movement 220C, the second region may alternatively be input region 203 and the first input-movement may therefore be from input region 205 to input region 203. And as shown by first input-movement 220K, the second region may alternatively be input region 212 and the first input-movement may therefore be from input region 205 to input region 212. As shown by the multiple other first input-movement paths 220A, 220B, and 220D-220J, indicated by arrows extending from input region 205 to multiple other input regions 201, 202, and 206-211, respectively, multiple other first input-movement paths from input region 205 are possible as well.

As shown in FIG. 2E, the first input-movements may be depicted by user-interface graphical display 210 as well. For example, user-interface graphical display 210 may depict input-movement 222D from the "5 region" to the "4 region," may depict input-movement 222E from the "5 region" to the "6 region," and may depict input-movement 222K from the "5 region" to the "# region."

Any of the first input-movements discussed above with respect to user-interface 200 as shown in FIG. 2D, and/or user-interface graphical display 210 as shown in FIG. 2E, may generally indicate that the user desires to select one of the characters, or execute one of the computing commands, associated with the second region. More particularly, for example, if the user desires to select one of the characters "4", "g", "h", or "i", the user may execute first input-movement 220D/222D. As another example, if the user desires to enter one of the characters "3", "d", "e", or "f", the user may execute input-movement 220C/222C. As another example still, if the user desires to enter the character "#", or to execute a computing command associated with the "ENTER" command, the user may execute input-movement 220K/222K.

Once data indicating any of first input-movements 220A-220K has been received by the computing system, the computing system may be configured to generally recognize that the user may intend to select one of the characters and/or to execute one of the computing commands associated with the second region. However, in the case that multiple characters and/or computing commands are associated with the second input region, after such a first input-movement, it may not be clear which particular character and/or computing command the user intends to select. In other words, it may be ambiguous as to which particular character and/or computing command associated with the second region that the user intends to select. In accordance with the example methods described herein, a second input-movement from the second region may be used to disambiguate.

c. Second Input-Movement

At block 106 and at block 156, respectively, example method 100 and example method 150 continue with the computing system receiving second data indicating input-movement from a second region to the home region. The second region and the home region may be the same second region and the same home region as discussed above with respect to block 104. With reference to FIG. 3A, for example, input region 205 may be the home region. According to such an example, any of other input regions 201-204, and 206-212 may be the second region (depending, for example, on the first input-movement).

Generally, the second input-movement may be input-movement from the second region straight to the home region. However, the second input-movement may alternatively be input-movement from the second region, through a third region from the plurality of input regions, to the home region. A number of examples of such various second input-movements are shown with respect to FIGS. 3A-3D. However, it should be understood that FIGS. 3A-3D, and their description, are provided for purposes of explanation only and should not be taken to be limiting. Other examples of second input-movements, some of which are discussed elsewhere herein, may be possible as well.

In an example embodiment, second input-movement involving movement from a second region to the home region may generally be associated with selection of a character from a subset of secondary characters associated with the second region. For example, as shown by second input-movement 310A, the second region may be input region 202 and the second input-movement may therefore generally be from input region 202 (the second region) to input region 205 (the home region). Second input-movement 310A is characterized by input-movement from input region 202, through input region 201, to input region 205. As another example, second input-movement 312A is similarly shown as generally being from input region 202 to input region 205. However, second input-movement 312A is characterized by input-movement from input region 202, through input region 203, to input region 205. As another example still, second input-movement 314 is also similarly shown as generally being from input region 202 to input region 205. However, second input-movement 314A is characterized by input-movement straight from input region 202 to input region 205, without movement through a third region. Generally, therefore, each of second input-movements 310A, 312A, and 314A may be recognized by a computing system as separate and distinct second input-movements.

Because second input-movements 310A, 312A, and 314A may be recognized as separate and distinct second input-movements, the second input-movements may be used to disambiguate between the various characters and/or computing commands associated with the second region. Recall that, with reference to FIG. 3B, the "2 region" depicted by user-interface graphical display 210 is associated with the characters "a", "b", and "c". Thus, for example, second input-movement 310B depicted by user-interface graphical display 210, which generally corresponds to second input-movement 310A, may be associated with the character "a". Also, second input-movement 312B depicted by user-interface graphical display 210, which generally corresponds to second input-movement 312A, may be associated with the character "c". And second input-movement 314B depicted by user-interface graphical display 210, which generally corresponds to input-movement 314B, may be associated with the character "b".

Figures 3C, 3D:
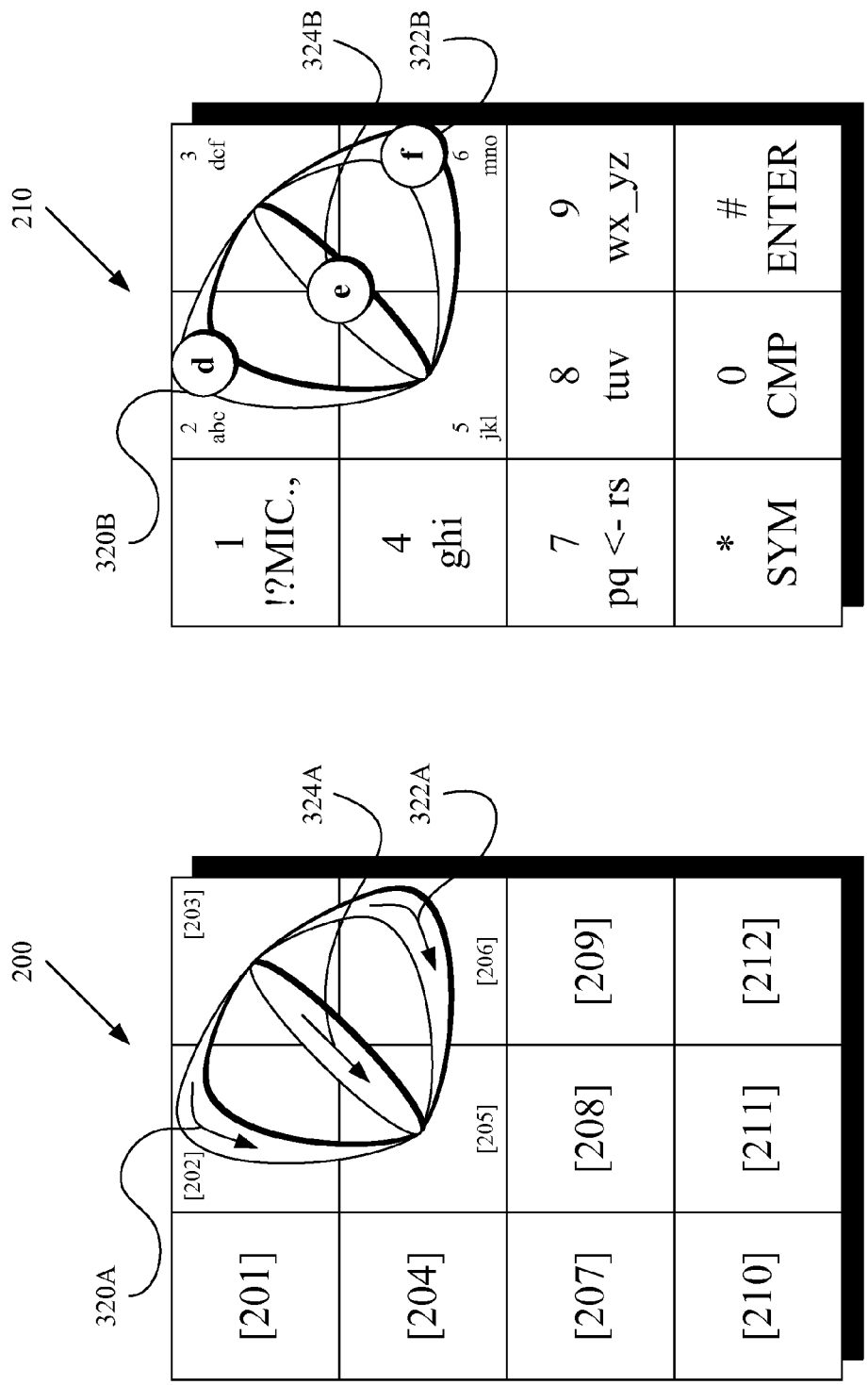
FIG. 3C shows additional example second input-movements in accordance with an example method for receiving user-inputs.
FIG. 3D shows aspects of an example user-interface graphical display in accordance with the second input-movements shown in FIG. 3C.

Turning now to FIGS. 3C and 3D, additional examples of second input-movements are shown. For example, as shown by second input-movement 320A, the second region may be input region 203 and the second input-movement may therefore generally be from input region 203 (the second region) to input region 205 (the home region). However, second input-movement 320A is characterized by input-movement from input region 203, through input region 202, to input region 205. As another example, second input-movement 322A is similarly shown as generally being from input region 203 to input region 205. However, second input-movement 322A is characterized by input-movement from input region 203, through input region 206, to input region 205. As another example still, second input-movement 324A is also similarly shown as generally being from input region 203 to input region 205. However, second input-movement 324A is characterized by input-movement straight from input region 203 to input region 205, without movement through a third region. Generally, therefore, each of second input-movements 320A, 322A, and 324A may be recognized by a computing system as separate and distinct input-movements.

Because second input-movements 320A, 322A, and 324A may be recognized as separate and distinct second input-movements, the second input-movements may be associated with particular characters and/or computing commands associated with the second region. Therefore, they may be used to disambiguate between the various characters and/or computing commands associated with the second region. For example, recall that, with reference to FIG. 3D, the "3 region" depicted by user-interface graphical display 210 is associated with the characters "d", "e", and "f". Second input-movements 320B, 322B, and 324B depicted by user-interface graphical display 210, which generally correspond respectively to second input-movements 320A, 322B, and 324B, may therefore be associated respectively with the characters "d", "f", and "e".

While the second input-movement may be input-movement from the second region either straight to the home region or through a third region to the home region, the second input-movement may alternatively be through a third region from the plurality of input regions and through a fourth region from the plurality of input regions to the home region. A number of examples of such second input-movements are shown with respect to FIGS. 4A-4D. However, it should be understood that FIGS. 4A-4D, and their description, are provided for purposes of explanation only and should not be taken to be limiting. Other examples of second input-movements, some of which are described elsewhere herein, may be possible as well.

As shown in FIG. 4A, the second region may be input region 201 and the home region may be input region 205. The second input-movement may therefore generally be from input region 202 (the second region) to input region 205 (the home region). Both of second input-movements 410A and 412A involve input-movement from input region 201, through a third input region, to input region 205. Second input-movement 410A is characterized by input-movement from input region 201, through input region 204, to input region 205. Second input-movement 412A is characterized by input-movement from input region 201, through input region 202, to input region 205.

Each of input-movements 416A and 418A, however, involve input-movement from input region 201, through a third input region and a fourth input region, to input region 205. Second input-movement 416A is characterized by input-movement from input region 201, through input region 204 and through input region 207, to input region 205. Second input-movement 418A is characterized by input-movement from input region 201, through input region 202 and through input region 203, to input region 205.

Second input-movement 414A is characterized by input-movement straight from input region 201 to input region 205, without movement through a third region or a fourth region. Generally, therefore, each of second input-movements 410A, 412A, 414A, 416A, and 418A may be recognized by a computing system as separate and distinct second input-movements.

Because input-movements 410A, 412A, 414A, 416A, and 418A may be recognized as separate and distinct second input-movements, the second input-movements may be associated with particular characters and/or computing commands associated with the second region. Therefore, they may be used to disambiguate between the various characters and/or computing commands associated with the second region. Recall that, with reference to FIG. 4B, the "1 region" of user-interface graphical display 210 is associated with the characters "!", "?", ".", and ",", as well as the computing command "MIC". Thus, for example, second input-movement 410B depicted by user-interface graphical display 210, which generally corresponds to second input-movement 410A, may be associated with the character "?". Second input-movement 412B depicted by user-interface graphical display 210, which generally corresponds to second input-movement 412A, may be associated with the character ".". Second input-movement 416B depicted by user-interface graphical display 210, which generally corresponds to second input-movement 416A, may be associated with the character "!". Second input-movement 418B depicted by user-interface graphical display 210, which generally corresponds to input-movement 418A, may be associated with the character ",". And second input-movement 414B depicted by user-interface graphical display 210, which generally corresponds to second input-movement 414A, may be associated with the computing command "MIC".

Turning now to FIGS. 4C and 4D, additional examples of second input-movements are shown. As shown in FIG. 4C, the second input region may be input region 207 and the home region may be input region 205. The second input-movement may therefore generally be from input region 207 (the second region) to input region 205 (the home region). Each of second input-movements 420A and 422A involve input-movement from input region 207, through a third input region, to input region 205. Second input-movement 420A is characterized by input-movement from input region 207, through input region 204, to input region 205. Second input-movement 422A is characterized by input-movement from input region 207, through input region 208, to input region 205.

Each of input-movements 426A and 428A, however, involve input-movement from input region 207, through a third input region and a fourth input region, to input region 205. Second input-movement 426A is characterized by input-movement from input region 207, through input region 204 and through input region 201, to input region 205. Second input-movement 428A is characterized by input-movement from input region 207, through input region 208 and through input region 209, to input region 205.

Second input-movement 424A is characterized by input-movement straight from input region 207 to input region 205, without movement through a third region or a fourth region. Generally, therefore, each of second input-movements 420A, 422A, 424A, 426A, and 428A may be recognized by a computing system as separate and distinct second input-movements.

Because second input-movements 420A, 422A, 424A, 426A, and 428A may be recognized as separate and distinct second input-movements, the second input-movements may be associated with particular characters and/or computing commands associated with the second region. Therefore, they may be used to disambiguate between various characters and/or computing commands associated with the second region. Recall that, with reference to FIG. 4D, the "7 region" of user-interface graphical display 210 is associated with the characters "p", "q", "r", and "s", as well as the computing command "←". Thus, for example, second input-movement 420B depicted by user-interface graphical display 210, which generally corresponds to second input-movement 420A, may be associated with the character "q". Second input-movement 422B depicted by user-interface graphical display 210, which generally corresponds to second input-movement 422A, may be associated with the character "r". Second input-movement 426B depicted by user-interface graphical display 210, which generally corresponds to second input-movement 426A, may be associated with the character "p". Second input-movement 428B depicted by user-interface graphical display 210 on user-interface graphical display 210, which generally corresponds to input-movement 428A, may be associated with the character "s". And second input-movement 424B depicted by user-interface graphical display 210, which generally corresponds to second input-movement 424A, may be associated with the computing command "←".

While the second region may generally be adjacent to the home region, as is the case with respect to the example input-movements described with respect to FIGS. 3A-3D and FIGS. 4A-4D, the second region may not be adjacent to the home region. Thus, the second input-movement may be from an input region that is not adjacent to the home region to the home region. A number of examples of such second input-movements are shown with respect to FIGS. 5A and 5B. However, it should be understood that FIGS. 5A and 5B, and their description, are provided for purposes of explanation only and should not be taken to be limiting. Other examples of second input-movements, some of which are described elsewhere herein, may be possible as well.

As shown in FIG. 5A, the second input region may be input region 210 and the home region may be input region 205. The second input-movement may therefore generally be from input region 210 (the second region) to input region 205 (the home region), as shown by second input-movement 510A. Further, the second input region may be input region 211, and the second input-movement may therefore generally be from input region 211 (the second region) to input region 205 (the home region), as shown by second input-movement 514A. Further still, the second input region may be input region 212, and the second input-movement may therefore generally be from input region 212 (the second region) to input region 205 (the home region), as shown by second input-movement 512A.

Recall that, with reference to FIG. 5B, the "* region" of user-interface graphical display 210 is associated with the character "*", the "0 region" is associated with the character "0", and the "# region" is associated with the character "#". Thus, for example, second input-movement 510B depicted by user-interface graphical display 210, which generally corresponds to second input-movement 510A, may be associated with the character "*". Second input-movement 512B depicted by user-interface graphical display 210, which generally corresponds to second input-movement 512A, may be associated with the character "#". And second input-movement 514B depicted by user-interface graphical display 210, which generally corresponds to second input-movement 514A, may be associated with the character "0".

d. Home-Region Input-Movement and Display Transformation

While the first input movements and second input movements shown above with respect to FIGS. 2D-2E, 3A-3D, 4A-4D, and 5A-5B allow for selection of characters and/or computing commands associated with input regions 201-204 and 206-212, those input movements do not allow for selection of characters and/or computing commands associated with input region 205. In other words, those input regions do not allow for selection of characters and/or computing commands associated with the home region. Thus, described below is a further aspect of the present example embodiment that provides for the selection of characters and/or computing commands that are associated with a home region.

While the second input-region may generally correspond to an input region that is entirely separate and distinct from the home region, it is possible that the home region and the second region may be first and second portions, respectively, of a single input region. Thus, it may be possible to associate characters with the home region and to disambiguate between the characters associated with the home region by movements within the home region itself. As an example, a first input-movement from a first portion of the home region to a second portion of the home region, followed by a second input-movement from the second portion of the home region to the first portion of the home region, may be associated with a particular character.

Figures 6A, 6B:
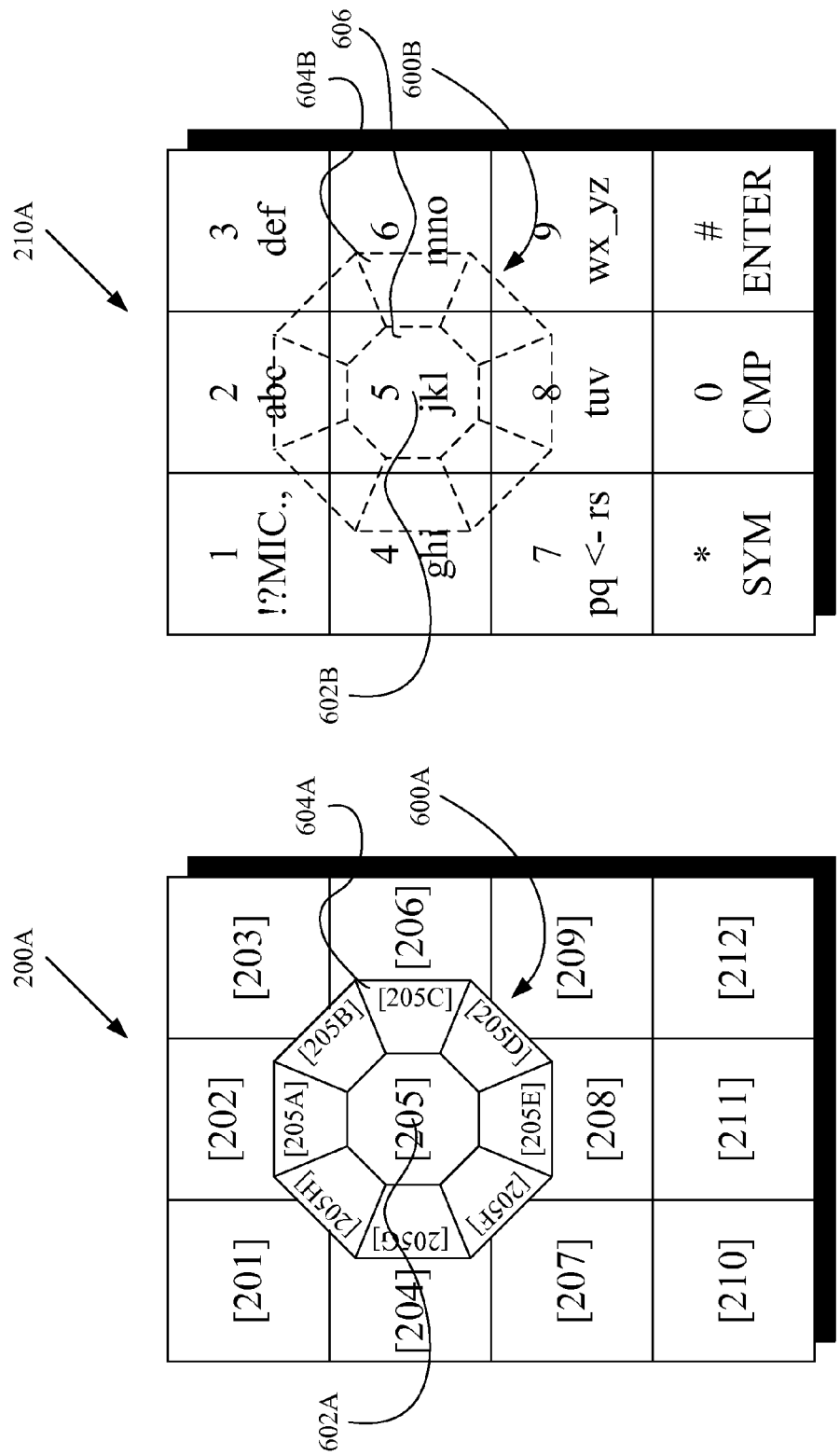
FIG. 6A shows aspects of an example user-interface having an extended home region in accordance with an example method for receiving user-inputs.
FIG. 6B shows aspects of an example user-interface graphical display in accordance with the user-interface shown in FIG. 6A.

With reference to FIG. 6A, the home region of user-interface 200A may be arranged so as to include a number of input portions within an extended home region 600A. That is, input region 205 may be extended to include portions 205A-205H. In this way, movements to, from, or between any of the portions of extended home region 600A may be recognized by the computing system as input-movements.

With reference to user-interface graphical display 210A as shown in FIG. 6B, user-interface 200A including extended home region 600A, may be implemented while user-interface graphical display 210A visually depicts user-interface 200A as having a uniform distribution of input regions, similar to the depiction provided by user-interface graphical display 210. Thus, while user-interface graphical display 210A may depict extended home region 600B (depicted as "optional" by dashed lines), as well as the various input portions included in extended home region 600B, which generally corresponds to extended home region 600A, user-interface graphical display 210A may appear similar to user-interface graphical display 210.

In some embodiments, movements on a user-interface that includes an extended home region 600A, such as user-interface 200A, may be mapped to a graphical display that depicts a uniform distribution of input regions as shown, for example, in FIG. 6B. Thus the visual depiction of an input region that corresponds to an extended home region, such as extended home region 600A, may not visually depict the true size or shape of the extended home region. For example, extended home region 600A is actually larger, and of a different shape, than the visual depiction of the input region associated with extended home region 600B, the "5 region".

To account for this inconsistency between the size and shape of extended home region 600A and its visual depiction as the "5 region" in user-interface graphical display 210A, generally, movements within extended home region 600A may be non-linearly mapped to the visual depiction of the "5 region" so that input-movements within extended home region 600A may be depicted as occurring within the "5 region". As one example, an input-movement from point 602A within extended home region 600A to point 604A within extended home region 600A, may be visually depicted by user-interface graphical display 210A as an input-movement from point 602B to point 606 (as opposed to point 604B). In this way, input-movements within extended home region 600A may be non-linearly mapped, or "transformed," to depict input-movements within the visual depiction of the "5 region" by user-interface graphical display 210A.

Such a transformation may result in an improved user experience when, for example, the user desires to input characters associated with the home region. The transformation between extended home region 600A and its visual depiction as the "5 region" by user-interface graphical display 210A, may result in a sensation that the home region is "sticky" or that there is a slight boundary between the home region and other input regions that must be overcome before the pointer is moved outside of the home region. This sensation may provide for increased user control when, for example, carrying out input-movements to, from, or between portion 205 and/or any of portions 205A-205H of extended home region 600A.

Figures 6C, 6D:
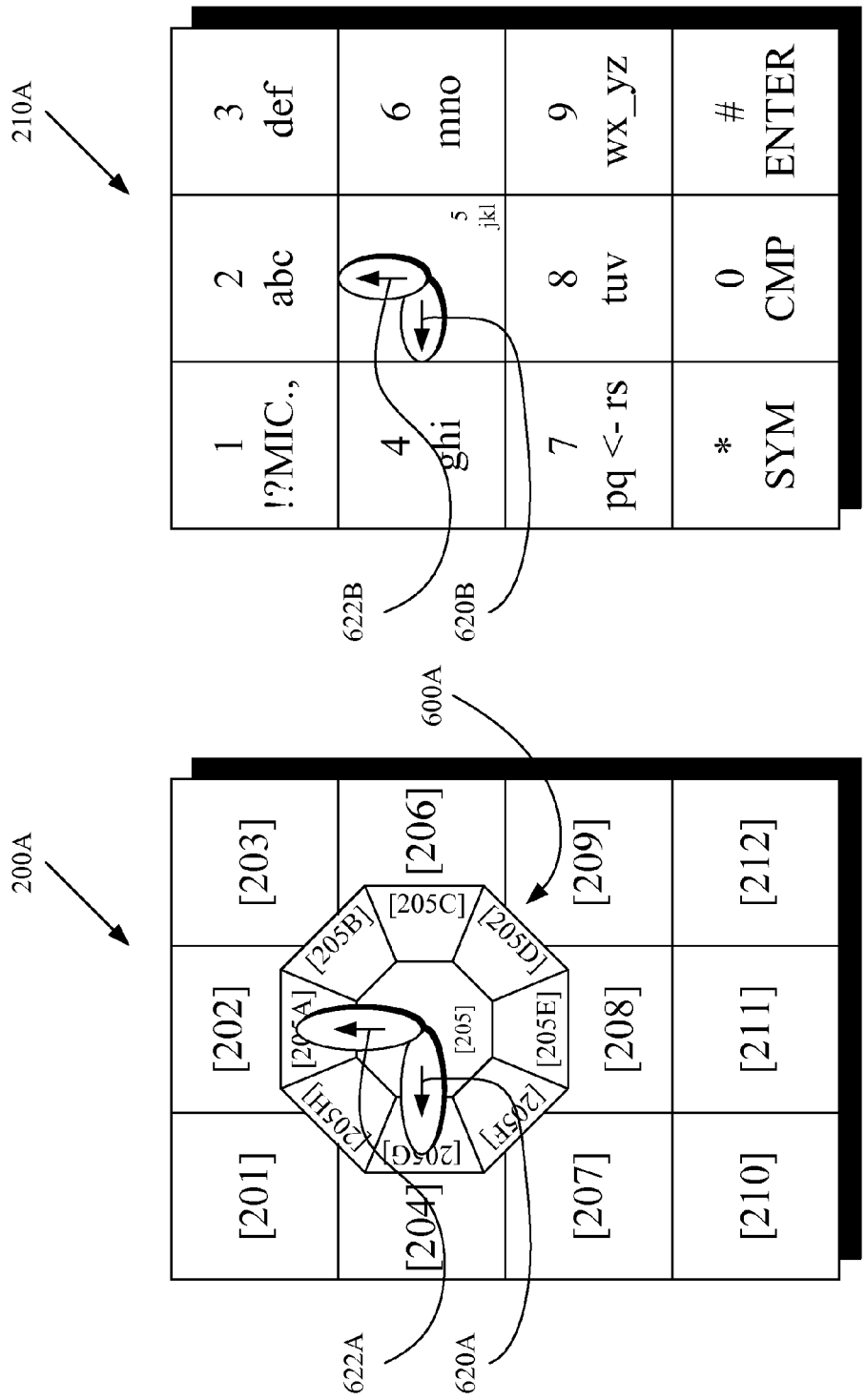
FIG. 6C shows additional example first input-movements in accordance with an example method for receiving user-inputs.
FIG. 6D shows aspects of an example user-interface graphical display in accordance with the first input-movements shown in FIG. 6C.

Recall that, at block 104 of example method 100, the computing system receives first data indicating a first input-movement from a home region to a second region. With reference to FIG. 6C, the home region and the second region may be, for example, portion 205, and/or any of portions 205A-205H of extended home region 600A.

As shown by first input-movement 620A, the second region may be portion 205G and the first input-movement may therefore be from portion 205 of extended home region 600A (the home region) to portion 205G of extended home region 600A (the second region). And as shown by first input-movement 622A, the second region may be portion 205A and the first input-movement may therefore be from portion 205 of extended home region 600A to portion 205A of extended home region 600A. Multiple other such first input-movement paths within input region 205 are possible as well.

As shown in FIG. 6D, user-interface graphical display 210A may depict transformations of first input-movements such as first input-movement 620A and first input-movement 622A. For example, user-interface graphical display 210A may depict first input-movement 620A as transformed first input-movement 620B, within the "5 region". As another example, user-interface graphical display 210A may depict first input-movement 622A as transformed first input-movement 622B, within the "5 region".

Recall that at block 106 of example method 100, the computing system receives second data indicating input-movement from the second region to the home region. With reference to FIG. 6E, as shown by second input-movement 630A, the second input-movement may be from portion 205G of extended home region 600A (the second region) to portion 205 of extended home region 600A (the home region). And as shown by second input-movement 632A, the second input-movement may be from portion 205A of extended home region 600A to portion 205 of extended home region 600A. Multiple other such second input-movement paths within input region 205 are possible as well.

As shown in FIG. 6F, user-interface graphical display 210A may depict transformations of second input-movements such as second input-movement 630A and second input-movement 632A. For example, user-interface graphical display 210A may depict second input-movement 630A as transformed first input-movement 630B, within the "5 region". As another example, user-interface graphical display 210A may depict second input-movement 632A as transformed first input-movement 632B, within the "5 region".

Any of the input-movements discussed above with respect to FIG. 6C may indicate that the user desires to select one of the characters and/or computing command associated with the home region. More particularly, for example, if the user desires to select one of the characters "j", "k", or "l", a user may carry out a combination of first and second input-movements within the extended home region that is respectively associated with the desired character. For example, the combination of first input-movement 620A and second input-movement 630A, as shown in FIG. 6E, may be associated with character J, as shown in FIG. 6F. As another example, the combination of first input-movement 622A and second input-movement 632A, as shown in FIG. 5E, may be associated with character K, as shown in FIG. 6F.

Although various input-movements described above generally involve movement from one input region to another input region, the second input-movement may also take the form of input-movement away from the user-interface. In an example embodiment, second input-movement involving movement away from the user-interface may be generally associated with the selection of a primary character.

Detection of such an input-movement away from the user-interface may be accomplished in any suitable manner. As one example, user-interface 200 may be configured to transmit data indicating that there has been an input-movement away from user-interface 200. As another example, user-interface 200 may stop transmitting data indicating that the user is in contact with user-interface 200 once the user is no longer in contact with user-interface 200. Correspondingly, the computing system may be configured to recognize that there has been an input-movement away from user-interface 200 when the computing system has not received, after a threshold amount of time, data indicating contact with user-interface 200.

With reference again to FIG. 2E, the first-input movement may be first-input movement 222B from the "5 region" to the "3 region." The user may then select the character "3" by removing the pointer (for example a finger and/or stylus) from the surface of user-interface 200. As another example, the first-input movement may be first input-movement 220B from the "5 region" to the "4 region." The user may then select the character "4" by removing the pointer (for example a finger and/or stylus) from the surface of user-interface 200.

2. Character and Computing Command Selection

Returning now to FIGS. 1A and 1B, example method 100 continues at block 108 with the computing system selecting a character based on second data, and example method 150 continues at block 158 with the computing system selecting a computing command based on second data. As discussed above, various second input-movements may be associated with various particular characters and/or various particular computing commands. Further, upon detecting a second input-movement, user-interface 200 may be configured to generate data indicating the second input-movement, which user-interface 200 may then generally make available for use by other components of computing system 250, perhaps by way of system bus 264. Thus, the computing system may select a character and/or computing command associated with the second input-movement that is indicated by the second data it receives from user-interface 200.

As one example, computing system 250 may store correlation data in storage devices 266 and/or in system memory 258 that, generally, correlates certain characters and/or computing commands with certain second input-movements. Upon receiving second data indicating a second input-movement, processor 256 may reference the correlation data and select the character and/or computing command that is correlated with the indicated second input-movement. Those of skill in the art will appreciate that other manners, methods, and/or examples of selecting characters and/or computing commands may be possible as well.

3. Character Display and Computing Command Execution

Figure 7:
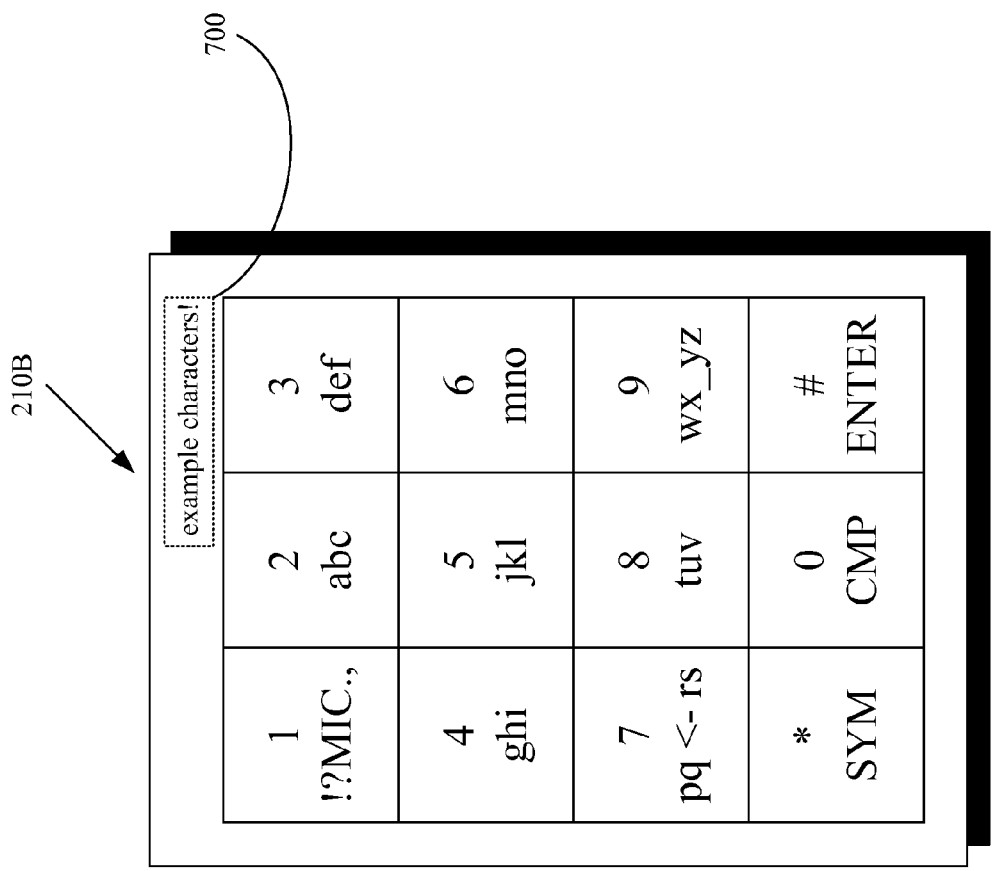
FIG. 7 shows aspects of an example user-interface graphical display arranged to display selected characters.

With reference to FIG. 1A, example method 100 continues at block 110 with the computing system causing the selected character to be displayed on a graphical display. Generally, the selected character may be displayed by a graphical display that is communicatively coupled to computing system 250, for example graphical display 252. In an example embodiment, the selected character may be displayed coincident with a user-interface graphical display such as user-interface graphical display 210. For example, with reference to FIG. 7, user-interface graphical display 210B includes, along with a visual depiction of user-interface 200, a display of selected characters 700 that displays characters that have been previously selected. In this case, the user, by entering a string of characters, has entered the phrase "example characters!". Other examples of displaying selected characters on a graphical display are possible as well including, but not limited to, displaying the characters elsewhere on user-interface graphical display 210B and/or displaying selected characters as part of any other suitable graphical user-interface including a graphical user interface of another computing application (such as a word processing application).

With reference to FIG. 1B, example method 150 continues at block 160 with the computing system causing the computing command to be executed. Generally, the selected computing command may be received and processed by processor 256, and then processor 256 may instruct any other component of computing system 250 to perform the functions necessary to execute the computing command. As discussed above, computing commands may include those related to manipulating a string of selected characters (for example, entering spaces and/or deleting characters) and/or computing commands may include commands to execute particular applications. Other examples of computing commands certainly exist as well.

4. Example Wearable Computing System

In an example embodiment, user interface 200 and user-interface graphical display 210 may be integrated into a system that is configured for receiving, transmitting, and displaying data, such as a wearable computing device. One particular type of wearable computing device is a head-mounted display (HMD). An HMD typically provides a heads-up display near to the user's eyes in such a manner that the user perceives the computer-generated graphics and the physical world simultaneously. In accordance with the systems and methods described herein, the heads-up display may include a user-interface graphical display.

Figure 8A:
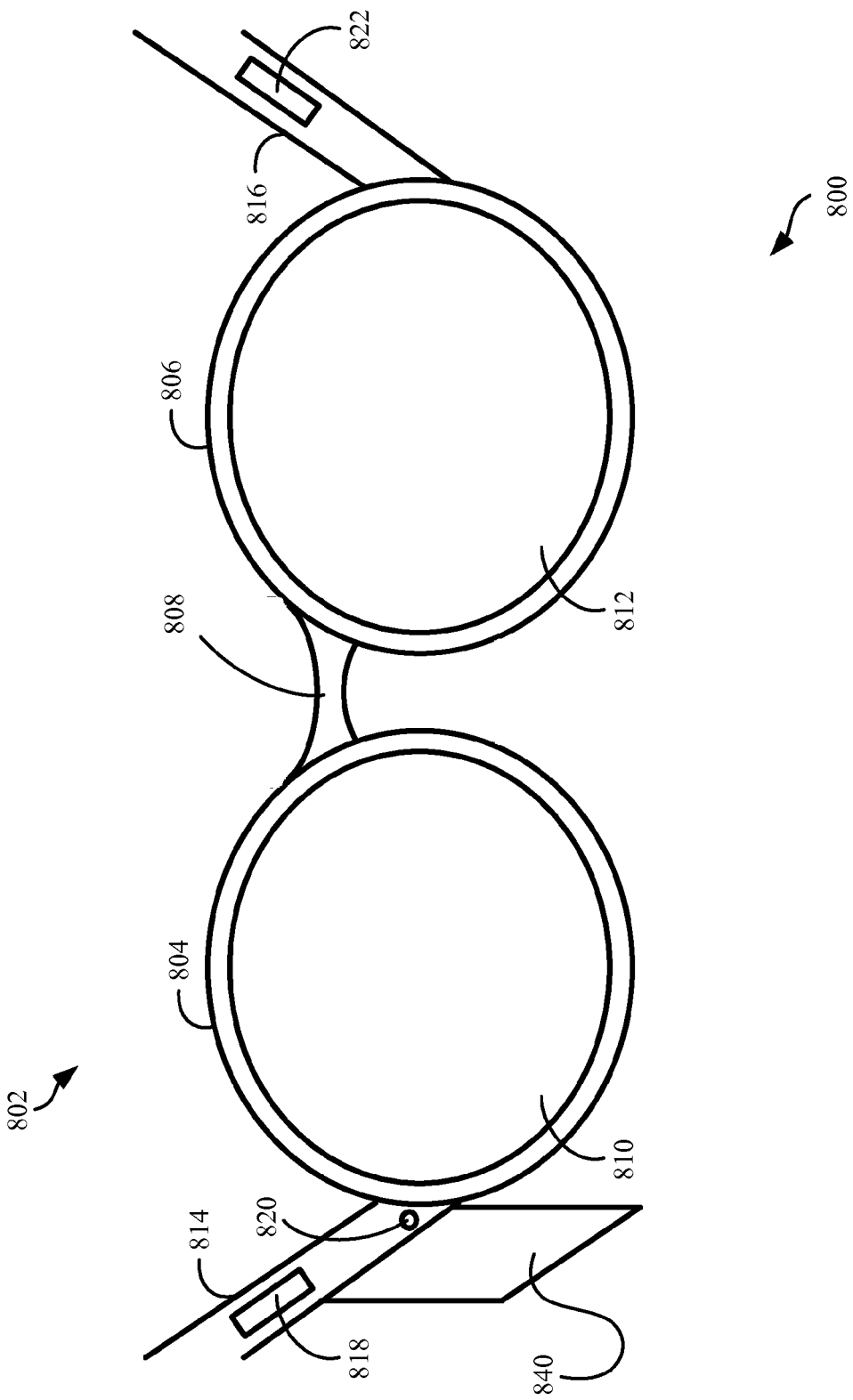
FIG. 8A shows a first view of an example wearable computing system including a user-interface and a heads-up display in accordance with an example embodiment.

FIG. 8A illustrates example system 800 for receiving, transmitting, and displaying data. System 800 is shown in the form of a wearable computing device that includes an HMD. While FIG. 8A illustrates eyeglasses 802 as an example of a wearable computing device, other types of wearable computing devices could additionally or alternatively be used. As illustrated in FIG. 8A, eyeglasses 802 comprise frame elements including lens-frames 804 and 806 and center frame support 808, lens elements 810 and 812, and extending side-arms 814 and 816. Center frame support 808 and extending side-arms 814 and 816 are configured to secure eyeglasses 802 to a user's face via a user's nose and ears, respectively. Each of frame elements 804, 806, and 808 and extending side-arms 814 and 816 may be formed of a solid structure of plastic or metal, or may be formed of a hollow structure of similar material so as to allow wiring and component interconnects to be internally routed through eyeglasses 802. Each of lens elements 810 and 812 may be formed of any material that can suitably display a projected image or graphic. Each of lens elements 810 and 812 may also be sufficiently transparent to allow a user to see through the lens element.

Extending side-arms 814 and 816 are each projections that extend away from frame elements 804 and 806, respectively, and are positioned behind a user's ears to secure eyeglasses 802 to the user. Extending side-arms 814 and 816 may further secure the eyeglasses 802 to the user by extending around a rear portion of the user's head. Additionally or alternatively, for example, system 800 may connect to or be affixed within a head-mounted helmet structure. Other possibilities exist as well.

System 800 may also include on-board computing system 818, video camera 820, and sensor 822. On-board computing system 818 is shown to be positioned on extending side-arm 814 of eyeglasses 802; however, on-board computing system 818 may be provided on other parts of eyeglasses 802. On-board computing system 818 may include a processor and memory, for example. On-board computing system 818 may be configured to receive and analyze data from video camera 820 (and possibly from other sensory devices, user interfaces, or both). More generally, on-board computing system may include any of those components and/or functional capabilities as described herein with respect to computing system 250.

Video camera 820 is shown to be positioned on extending side-arm 814 of eyeglasses 802; however, video camera 820 may be provided on other parts of eyeglasses 802. Video camera 820 may be configured to capture images at various resolutions or at different frame rates. Many video cameras with a small form-factor, such as those used in cell phones or webcams, for example, may be incorporated into an example of system 800. Although FIG. 8A illustrates one video camera 820, more video cameras may be used, and each may be configured to capture the same view, or to capture different views.

Sensor 822 is shown mounted on extending side-arm 816 of eyeglasses 802; however, sensor 822 may be provided on other parts of eyeglasses 802. Sensor 822 may include one or more of a gyroscope or an accelerometer, for example. Other sensing devices may be included within sensor 822 or other sensing functions may be performed by sensor 822.

Figure 8B:
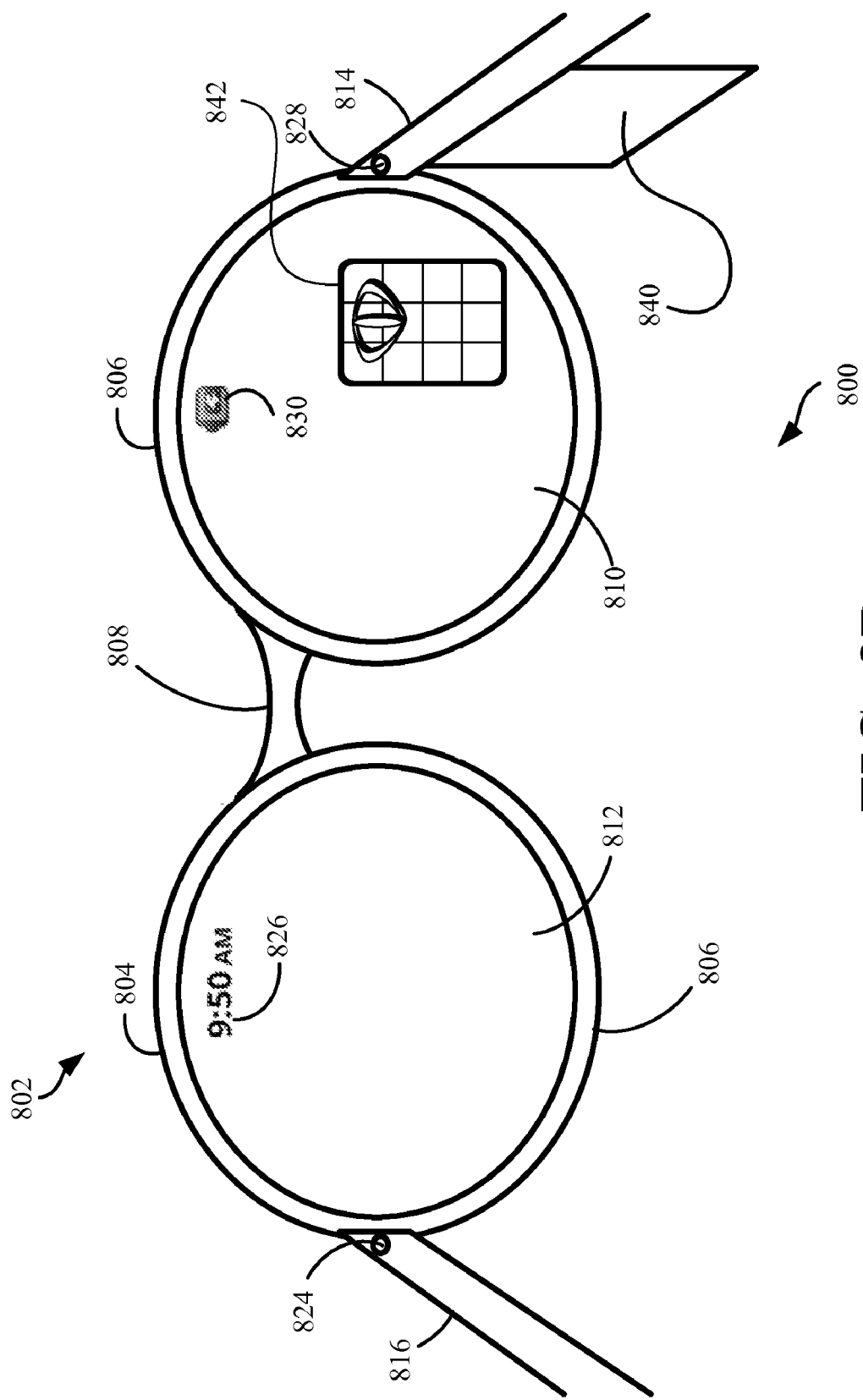
FIG. 8B shows a second view of the example wearable computing system shown in FIG. 8A.

FIG. 8B illustrates an alternate view of system 800 of FIG. 8A. As shown in FIG. 8B, lens elements 810 and 812 may act as display elements. Eyeglasses 802 may include first projector 824 coupled to an inside surface of extending side-arm 816 and configured to project display 826 onto an inside surface of lens element 812. Additionally or alternatively, second projector 828 may be coupled to an inside surface of extending side-arm 814 and configured to project display 830 and/or heads-up display 842 onto an inside surface of lens element 810.

Lens elements 810 and 812 may act as a combiner in a light projection system and may include a coating that reflects the light projected onto them from projectors 824 and 828. In some embodiments, a special coating may not be required (e.g., when projectors 824 and 828 are scanning laser devices).

In alternative embodiments, other types of display elements may also be used. For example, lens elements 810, 812 themselves may include a transparent or semi-transparent matrix display, such as an electroluminescent display or liquid crystal display. A corresponding display driver may be disposed within frame elements 804 and 806 for driving such a matrix display. Alternatively or additionally, a laser or LED source and scanning system could be used to draw a raster display directly onto the retina of one or more of the user's eyes. Other possibilities exist as well.

As noted above, a heads-up display 842, such as a display similar to user-interface graphic display 210, may be integrated into one of lens elements 810 and 812 in any manner described above. Thus, system 800 may present heads-up display 842 so that the user may see a user-interface graphical display and the physical world simultaneously.

System 800 may also include user-interface 840, which may be arranged similar to user-interface 200, and may be attached to extending side-arm 814 or another suitable component of eyeglasses 802. In this way, a user may interact with user-interface 840 while wearing eyeglasses 802 and observing visual depictions of input-movements and other computing functions in heads-up display 842.

Figure 8C:
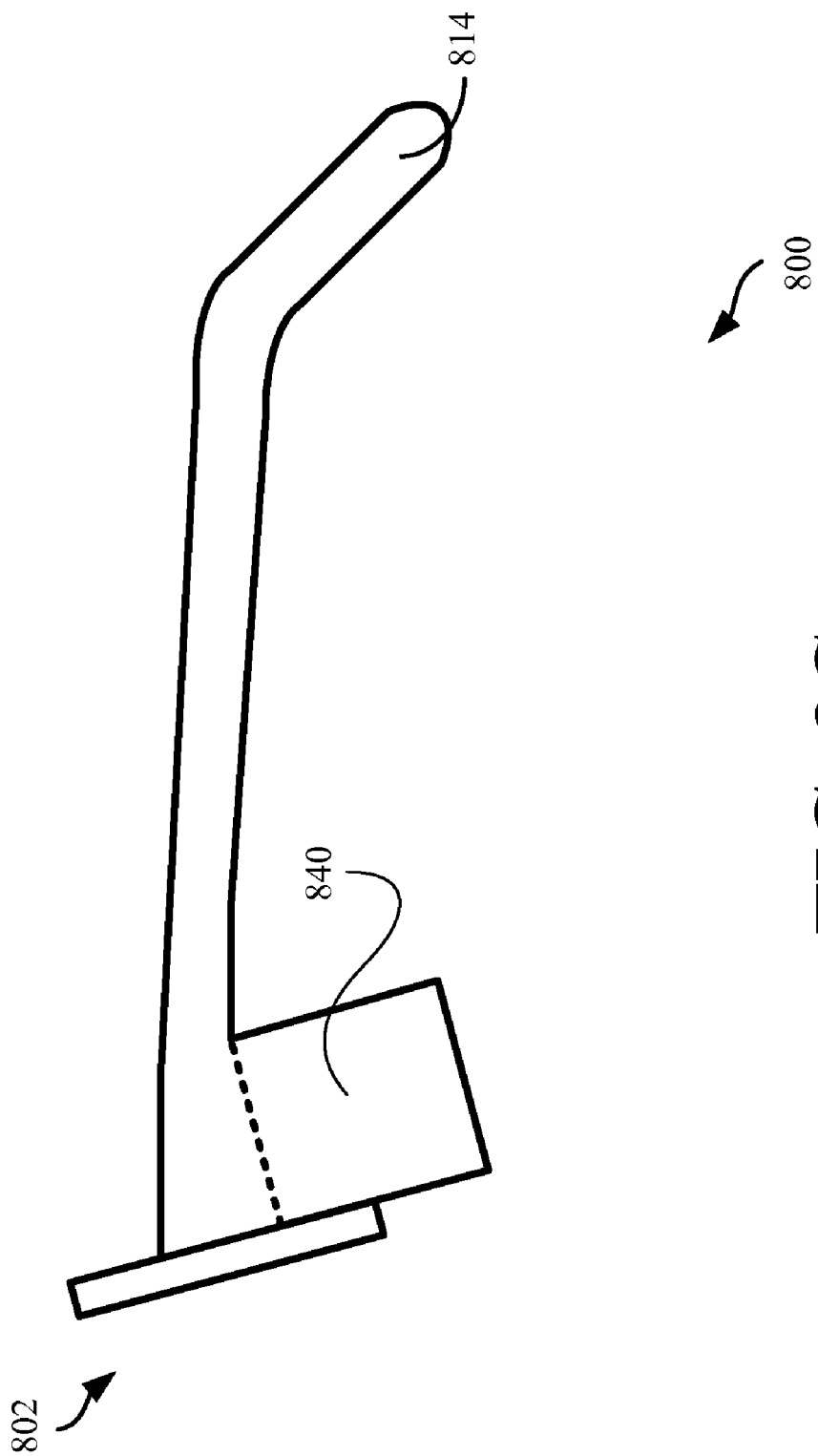
FIG. 8C shows a third view of the example wearable computing system shown in FIGS. 8A and 8B.

FIG. 8C shows yet another view of system 800, from the side. FIG. 8C depicts an alternative view of extending side-arm 814 and user-interface 840. Certain additional components, including any of those components shown and described with respect to computing system 250, may also be integrated into system 800 such that a computing system configured to carry out any of the functions described herein may be entirely contained by system 800 and integrated into eyeglasses 802.

5. Movement-Pixel Transformation

Generally, to provide a depiction of user inputs, a computing system will map a certain distance of input-movement on a user-interface (in real space) to a certain amount of distance on a user-interface graphical display (perhaps a number of pixels). In some arrangements the size and/or shape of a given user-interface may generally correspond to the size and/or shape of a user-interface graphical display that provides a visual depiction of the user-interface. In such a case, the number of pixels mapped to a given distance of an input-movement in the vertical direction will equal the number of pixels mapped to a given distance of an input-movement in the horizontal direction. The mapping of movement distance on a user-interface to number of pixels on a user-interface graphical display may be referred to as a movement-pixel transformation.

Note, however, that the size and/or shape of a given user-interface may not necessarily correspond to the size and/or shape of a user-interface graphical display that provides a visual depiction of the user interface. For example, user-interface 840 is shown as having a substantially square shape, whereas heads-up display 842 is shown as having a substantially rectangular shape. More particularly, with reference to FIG. 9, it may be the case that a ratio of user-interface 840 height 904A and user-interface 840 width 902A may not be equal to a ratio of user-interface graphical display 842 height 904B to user-interface graphical display 842 width 902B.

Generally, the entire user-interface 840 height 904A may be mapped to the entire user-interface graphical display 842 height 904B and the entire user-interface 840 width 902A may be mapped to the entire user-interface graphical display 842 width 902B. As a result, the number of pixels mapped to user-interface 840 height 904A may be generally greater than the number of pixels mapped to user-interface 842 width 902B. Thus, if a ratio of user-interface height and user-interface width is not equal to a ratio of user-interface graphical display height to user-interface graphical display width, a computing system may apply a first movement-pixel transformation to input movements along the height of the user-interface, and the computing system may apply a second movement-pixel transformation, that is not equal to the first movement-pixel transformation, to input movements along the width of the user-interface.

6. Further Aspects of Example Pointing Devices

Figure 10:
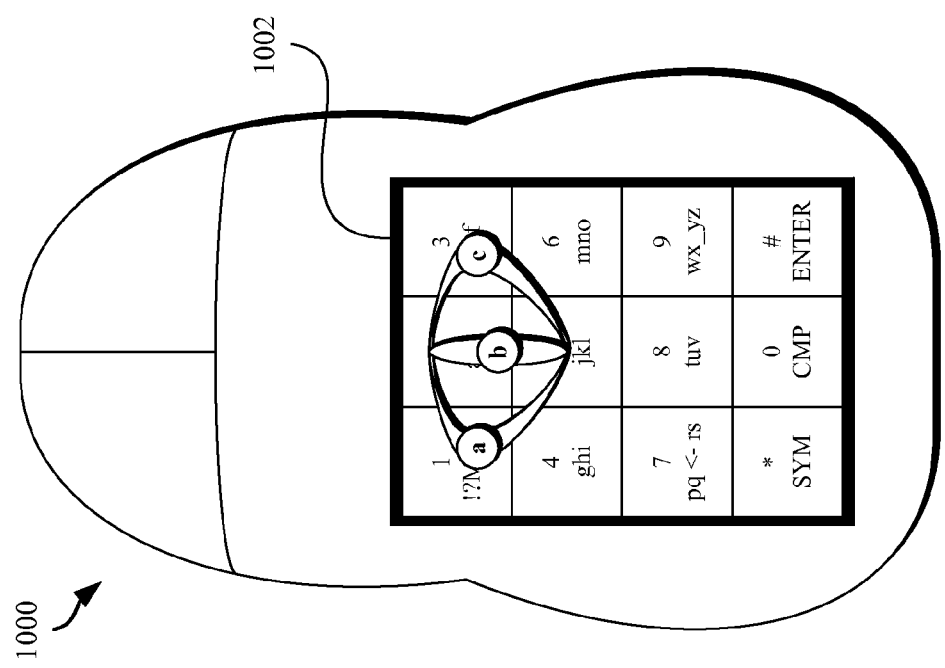
FIG. 10 shows an example pointing device in accordance with an example embodiment.

In an example embodiment, user-interface graphical display 210 may be integrated into a pointing device other than, or in addition to, a touchscreen. For example, user-interface graphical display 210 may be integrated into a mouse. FIG. 10 shows pointing device 1000, depicted as a mouse, including a user-interface in accordance with an example embodiment. In the example shown, the mouse includes user-interface 1002, which is depicted as a touchscreen user-interface having a user-interface, such as user-interface 200, embedded in a user-interface graphical display, such as user-interface graphical display 210. In this way, a user may interact with user-interface 1002 via input movements along the surface of pointing device 1000. Pointing device 1000 may also be used in accordance with other typical uses of a mouse.

Generally, computing system 250 may be further arranged to, after selecting a character and/or computing command, provide an indication that the character has been selected. As one example, providing an indication that the character and/or computing command has been selected may include causing a visual indication to be displayed on a graphical display. Such a visual indication may take the form of the selected character itself, as shown, for example, with respect to selected characters 700 in FIG. 700. Alternatively, the visual indication may take on some other form such as a visual confirmation, visual signal, and/or any other suitable visual indication.

As another example, providing an indication that a character and/or computing command has been selected may include causing a tactile indication to be provided at the user-interface. Such a tactile indication may take the form of any suitable haptic feedback now known or later developed. Such haptic feedback may generally include applying mechanical stimulation to the user via the user-interface by applying forces, vibrations, and/or motions to the user at the point of interaction with the user-interface.

As yet another example, providing an indication that a character and/or computing command has been selected may include causing an audible indication to be played by a speaker. Such an audible indication may be any tone, ring, statement of the selected character and/or computing command, and/or any other suitable audible indication that may be perceived by the user.

Computing system 250 may also be arranged to, after receiving input data from a user-interface, provide an indication that at least one of the first data and the second data has been received. The indication may be any indication similar to the indications described above. Such a visual indication may take the form of illuminating, expanding, or otherwise calling attention to an input region, and/or input regions, associated with the input data. Tactile and/or audible indications may also be provided in a manner suitable for calling attention to an input region, and/or input regions, associated with the input data.

7. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A system comprising:
a non-transitory computer readable medium; and
program instructions stored on the non-transitory computer readable medium and executable by at least one processor to cause a computing device to:
provide (a) a graphical display for display on a display device, and (b) a user-interface for receiving touch inputs on a user-interface device that is separate from the display device, and wherein the user-interface comprises a plurality of input regions, wherein one of the input regions is a home region that is an extended home region of a size that is different from a size of each of the other input regions, wherein each of the input regions is associated with a primary character from a set of primary characters, and wherein at least one of the input regions is a second input region associated with a subset of secondary characters from a set of secondary characters;
receive data indicating a first continuous input, the first continuous input comprising input-movement (c) from the home region to the second input region from the plurality of input regions that is associated with a subset of secondary characters and (d) from the second input region to the home region;
receive data indicating a second continuous input, the second continuous input comprising input-movement within the home region, wherein the input-movement within the home region comprises an input-movement (e) from a first portion of the home region to a second portion of the home region and (f) from the second portion of the home region to the first portion of the home region;
select, in response to the input-movement from the second input region to the home region, a character from the subset of secondary characters associated with the second input region;
select, in response to the input movement from the second portion of the home region to the first portion of the home region, a character from a subset of secondary characters associated with the home region; and
cause (g) the selected characters to be displayed on the graphical display and (h) a visual depiction of each input region to be displayed on the graphical display, wherein the visual depiction of the home region and each other input region is the same size.

2. The system of claim 1, wherein the user-interface corresponds to a keypad having buttons arranged in a three-by-four grid, wherein each of the plurality of input regions corresponds to a button of the keypad, wherein the set of primary characters comprises "0" through "9", "*", and "#", and wherein the set of secondary characters comprises "a" through "z".

3. The system of claim 1, wherein the data indicating the input-movement from the second input region to the home region comprises data indicating the input-movement from the second input region, through one or more input regions from the plurality of input regions, to the home region.

4. The system of claim 1, further comprising further comprising program instructions stored on the non-transitory computer readable medium and executable by at least one processor to cause a computing device to:
receive data indicating an input-movement from the home region to a third input region from the plurality of input regions;
detect an input-movement from the third input region away from the user-interface; and
select, in response to the input-movement from the third input region away from the user-interface, the primary character associated with the third input region.

5. The system of claim 1, further comprising program instructions stored on the non-transitory computer readable medium and executable by at least one processor to cause a computing device to:
receive data indicating an input-movement from the home region to a third input region from the plurality of input regions, wherein the third input region is associated with a computing command;
select, in response to the input-movement from the third input region to the home region, the computing command; and
cause the computing command to be executed.

6. The system of claim 1, further comprising program instructions stored on the non-transitory computer readable medium and executable by at least one processor to cause a computing device to:
after selecting the character, provide an indication that the character has been selected, wherein providing the indication that the character has been selected comprises at least one of (i) causing a visual indication to be displayed on the graphical display, (ii) causing a tactile indication to be provided at the user-interface, and (iii) causing an audible indication to be played by a speaker.

7. The system of claim 1, further comprising program instructions stored on the non-transitory computer readable medium and executable by at least one processor to cause a computing device to:
after receiving at least one of (i) the data indicating the input-movement from the home region to the second input region (ii) the data indicating the input-movement from the second input region to the home region, (iii) the data indicating the input-movement from the first portion of the home region to the second portion of the home region, and (iv) the data indicating the input-movement from the second portion of the home region to the first portion of the home region, provide an indication that data indicating an input-movement has been received, wherein providing the indication that data indicating an input-movement has been received comprises at least one of (i) causing a visual indication to be displayed on the graphical display, (ii) causing a tactile indication to be provided at the user-interface, and (iii) causing an audible indication to be played by a speaker.

8. The system of claim 1, further comprising program instructions stored on the non-transitory computer readable medium and executable by at least one processor to cause a computing device to:
receive data indicating an input-movement from the first portion of the home region to a third portion of the home region;
receive data indicating an input-movement from the third portion of the home region to the first portion of the home region; and
select, in response to the input-movement from the third portion of the home region to the first portion of the home region, the primary character associated with the home region.

9. The system of claim 1, wherein the system further comprises a head-mounted display, wherein the head-mounted display comprises at least one lens element, and wherein the graphical display is integrated into the at least one lens element.

10. The system of claim 9, wherein the user-interface is attached to the head-mounted display.

11. The system of claim 10, wherein the head-mounted display further comprises at least one extending side-arm, and wherein the user-interface is attached to one of the at least one extending side-arm.

12. The system of claim 1, wherein the user-interface comprises an interface height and an interface width, and wherein the graphical display comprises a display height and a display width, wherein a ratio of the interface height and the interface width is not equal to a ratio of the display height and the display width, the system further comprising program instructions stored on the non-transitory computer readable medium and executable by at least one processor to cause a computing device to:
apply a first movement-pixel transformation to input-movements along the height of the user-interface; and
apply a second movement-pixel transformation to input-movements along the width of the user-interface, wherein the second movement-pixel transformation does not equal the first movement-pixel transformation.

13. The system of claim 1, wherein the graphical display and the user-interface are physically integrated in a single pointing device, and wherein the user-interface is embedded in the graphical display.

14. A non-transitory computer readable medium having instructions stored thereon, the instructions comprising:
instructions for providing (a) a graphical display for display on a display device, and (b) a user-interface for receiving touch inputs on a user-interface device that is separate from the display device, and wherein the user-interface comprises a plurality of input regions, wherein one of the input regions is a home region that is an extended home region of a size that is different from a size of each of the other input regions, wherein each of the input regions is associated with a primary character from a set of primary characters, and wherein at least one of the input regions is a second input region associated with a subset of secondary characters from a set of secondary characters;
instructions for receiving data indicating a first continuous input, the first continuous input comprising input-movement (c) from the home region to the second input region from the plurality of input regions that is associated with a subset of secondary characters and (d) from the second input region to the home region;
instructions for receiving data indicating a second continuous input, the second continuous input comprising input-movement within the home region, wherein the input-movement within the home region comprises an input-movement (e) from a first portion of the home region to a second portion of the home region and (f) from the second portion of the home region to the first portion of the home region;
instructions for selecting, in response to the input-movement from the second input region to the home region, a character from the subset of secondary characters associated with the second input region;
instructions for selecting, in response to the input movement from the second portion of the home region to the first portion of the home region, a character from a subset of secondary characters associated with the home region; and
instructions for causing (g) the selected characters to be displayed on the graphical display and (h) a visual depiction of each input region to be displayed on the graphical display, wherein the visual depiction of the home region and each other input region is the same size.

15. The non-transitory computer readable medium of claim 13, the instructions further comprising:
instructions for receiving data indicating an input-movement from the home region to a third input region from the plurality of input regions, wherein the third input region is associated with a computing command;
instructions for selecting, in response to the input-movement from the third input region to the home region, the computing command; and
instructions for causing the computing command to be executed.

16. A method comprising:
providing (a) a graphical display for display on a display device, and (b) a user-interface for receiving touch inputs on a user-interface device that is separate from the display device, and wherein the user-interface comprises a plurality of input regions, wherein one of the input regions is a home region that is an extended home region of a size that is different from a size of each of the other input regions, wherein each of the input regions is associated with a primary character from a set of primary characters, and wherein at least one of the input regions is a second input region associated with a subset of secondary characters from a set of secondary characters;

receiving data indicating a first continuous input, the first continuous input comprising input-movement (c) from the home region to the second input region from the plurality of input regions that is associated with a subset of secondary characters and (d) from the second input region to the home region;

receiving data indicating a second continuous input, the second continuous input comprising input-movement within the home region, wherein the input-movement within the home region comprises an input-movement (e) from a first portion of the home region to a second portion of the home region and (f) from the second portion of the home region to the first portion of the home region;

selecting, in response to the input-movement from the second input region to the home region, a character from the subset of secondary characters associated with the second input region;

selecting, in response to the input movement from the second portion of the home region to the first portion of the home region, a character from a subset of secondary characters associated with the home region; and causing (g) the selected characters to be displayed on the graphical display and (h) a visual depiction of each input region to be displayed on the graphical display, wherein the visual depiction of the home region and each other input region is the same size.

* * * * *

UNITED STATES PATENT AND TRADEMARK OFFICE
CERTIFICATE OF CORRECTION

PATENT NO. : 8,316,319 B1  
APPLICATION NO. : 13/108739  
DATED : November 20, 2012  
INVENTOR(S) : Patel Page 1 of 1

It is certified that error appears in the above-identified patent and that said Letters Patent is hereby corrected as shown below:

On the title page, item [54] and in the specification, column 1, line 1-4, delete "Efficient Selection of Characters and Commands Based on Movement-Inputs at a User-Inerface" and replace with --Efficient Selection of Characters and Commands Based on Movement-Inputs at a User-Interface--

Signed and Sealed this
Twenty-third Day of February, 2016

Michelle K. Lee
*Director of the United States Patent and Trademark Office*